US012636975B2

(12) United States Patent
Saeki et al.

(10) Patent No.: US 12,636,975 B2
(45) Date of Patent: May 26, 2026

(54) ELECTRIC PASSENGER TRANSPORT VEHICLE

(71) Applicant: KAWASAKI MOTORS, LTD., Akashi (JP)

(72) Inventors: Daisuke Saeki, Lincoln, NE (US); Kazumasa Hisada, Lincoln, NE (US); Takuya Ito, Akashi (JP); Tomotaka Nakagawa, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 285 days.

(21) Appl. No.: 18/462,463

(22) Filed: Sep. 7, 2023

(65) Prior Publication Data

US 2024/0174134 A1      May 30, 2024

Related U.S. Application Data

(60) Provisional application No. 63/428,402, filed on Nov. 28, 2022.

(51) Int. Cl.
*B60N 2/01* (2006.01)
*B60K 1/00* (2006.01)
*B60N 2/75* (2018.01)

(52) U.S. Cl.
CPC .................. *B60N 2/01* (2013.01); *B60K 1/00* (2013.01); *B60N 2/753* (2018.02)

(58) Field of Classification Search
CPC .... B60N 2/01; B60N 2/753; B60N 2002/363; B60N 2002/0216; B60N 2002/0212; B60N 2/3036; B60N 2/30; B60N 2/3038; B60N 2/75; B60N 2/305; B60K 1/00

USPC .......................................................... 180/65
See application file for complete search history.

(56) References Cited

U.S. PATENT DOCUMENTS

| | | | |
|---|---|---|---|
| 7,264,298 | B2 | 9/2007 | Cover |
| 7,416,238 | B2 | 8/2008 | Houston |
| 8,136,859 | B2 | 3/2012 | Morita et al. |
| 8,387,734 | B2 | 3/2013 | Krosschell et al. |
| 9,764,767 | B2 | 9/2017 | Proulx et al. |
| 10,363,843 | B2 | 7/2019 | Kawakami et al. |
| 2004/0160081 | A1* | 8/2004 | Horsford .............. B60N 2/3031 296/65.09 |
| 2006/0244281 | A1 | 11/2006 | Cover |
| 2007/0176454 | A1* | 8/2007 | Houston .............. B60N 2/3065 296/63 |
| 2009/0184536 | A1* | 7/2009 | Kubota .................. B62D 25/10 296/65.09 |

(Continued)

*Primary Examiner* — Scott A Reinbold
(74) *Attorney, Agent, or Firm* — XSENSUS LLP

(57) ABSTRACT

An electric passenger transport vehicle according an embodiment may include: a vehicle body including a floor, a first seat base, a second seat base provided on a rear side of the first seat base; a first seat including a first seat bottom attached to an upper surface of the first seat base; and a second seat including a second seat bottom attached to an upper surface of the second seat base. The second seat bottom is supported by the vehicle body such that the second seat bottom is movable between a first position in which a bottom surface of the second seat bottom is positioned above an upper surface of the second seat base and faces downward and a second position in which the bottom surface of the second seat bottom is positioned in front or back of the upper surface of the second seat base and faces upward.

17 Claims, 32 Drawing Sheets

(56) References Cited

U.S. PATENT DOCUMENTS

| | | | |
|---|---|---|---|
| 2010/0045087 A1* | 2/2010 | Pyun ........................ | B60N 2/99 |
| | | | 297/284.9 |
| 2010/0225082 A1* | 9/2010 | Krosschell ............... | B60N 2/38 |
| | | | 296/65.01 |
| 2011/0169289 A1* | 7/2011 | Arnold .................... | B60P 3/423 |
| | | | 296/10 |
| 2011/0187178 A1* | 8/2011 | King ....................... | B60P 3/423 |
| | | | 296/184.1 |
| 2014/0292027 A1* | 10/2014 | Uchiyama .............. | B60J 5/0487 |
| | | | 296/184.1 |
| 2016/0090057 A1* | 3/2016 | Hirooka ............... | B60N 2/3031 |
| | | | 296/190.03 |
| 2016/0176315 A1* | 6/2016 | Moore .................... | B60N 2/58 |
| | | | 297/108 |
| 2023/0373368 A1* | 11/2023 | Ubale ...................... | B60N 2/20 |
| 2025/0269772 A1* | 8/2025 | Gouldie ................. | B60N 2/763 |
| 2025/0332968 A1* | 10/2025 | Wei .......................... | B60N 2/36 |

* cited by examiner

ELECTRIC PASSENGER TRANSPORT VEHICLE

BACKGROUND

The disclosure relates to an electric passenger transport vehicle.

In a related art, there has been known an electric passenger transport vehicle, such as an electric cart like a golf cart, LSV(Low Speed Vehicle), and the like (see Patent Document 1: U.S. Patent Application Publication No. 2006/244281).

SUMMARY

In Patent Document 1, an electric passenger transport vehicle is provided at a rear portion thereof with a golf back rack serving as a loading section. However, in such an electric passenger transport vehicle, the loading section is relatively small and thus it may be desirable to enlarge the loading section.

An object of an embodiment of the disclosure is to provide an electric passenger transport vehicle that is capable of expanding a loading section.

A first aspect of the disclosure is an electric passenger transport vehicle that includes a vehicle body including a floor, a first seat base, a second seat base provided on a rear side of the first seat base; a first seat including a first seat bottom attached to an upper surface of the first seat base; and a second seat including a second seat bottom attached to an upper surface of the second seat base. The second seat bottom is supported by the vehicle body in such a manner that the second seat bottom is movable between a first position in which a bottom surface of the second seat bottom is positioned above an upper surface of the second seat base and faces downward and a second position in which the bottom surface of the second seat bottom is positioned in front of or in back of the upper surface of the second seat base and faces upward.

According to the first aspect, by developing the second seat bottom to the second position, the upper surface of the second seat base and the bottom surface of the developed second seat bottom form a loading section. As a result, the vehicle according to the first aspect can expand a loading section.

A second aspect of the disclosure is an electric passenger transport vehicle that includes: a vehicle body including a floor, plural seat bases spaced apart from each other in a longitudinal direction thereof and projecting upward from the floor; and a seat including a seat bottom attached to an upper surface of one of the plural seat bases and a seat back. The seat back is supported by the vehicle body in such a manner that the seat back is configured to be developed from a normal position in which the seat back is located above a rear end portion of the seat bottom and functions as a backrest for a passenger seated on the seat bottom to a retracted position above or below the normal position.

According to the second aspect, it is possible to expand a loading space formed above the seat bottom of the second seat, by developing the seat back from the normal position to the retracted position above or below the normal position.

DETAILED DESCRIPTION

Figure 1:
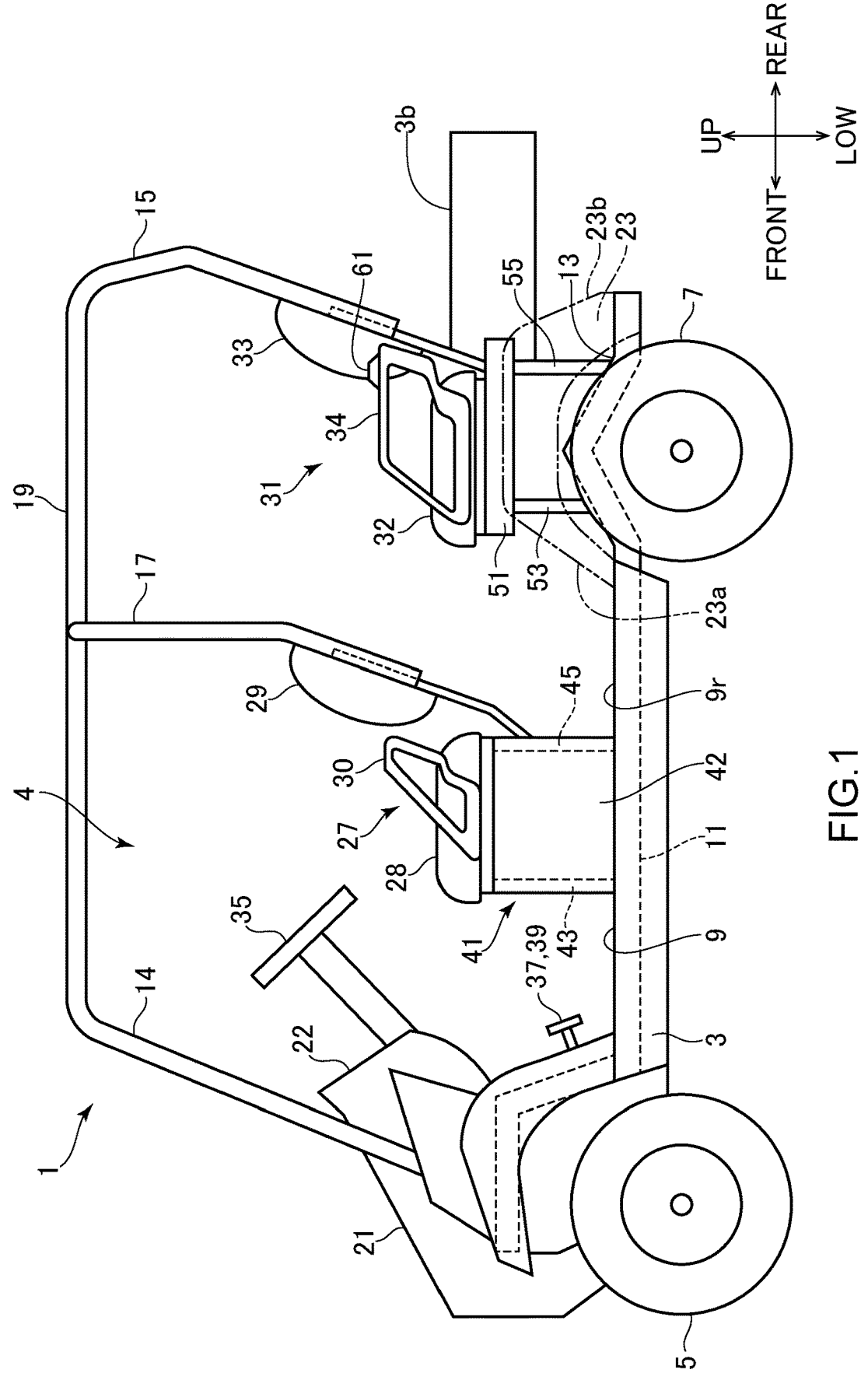
FIG. 1 is a side view of an electric cart as an electric passenger transport vehicle according to a first embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

[Outline Structure of Entire Vehicle]

Figure 2:
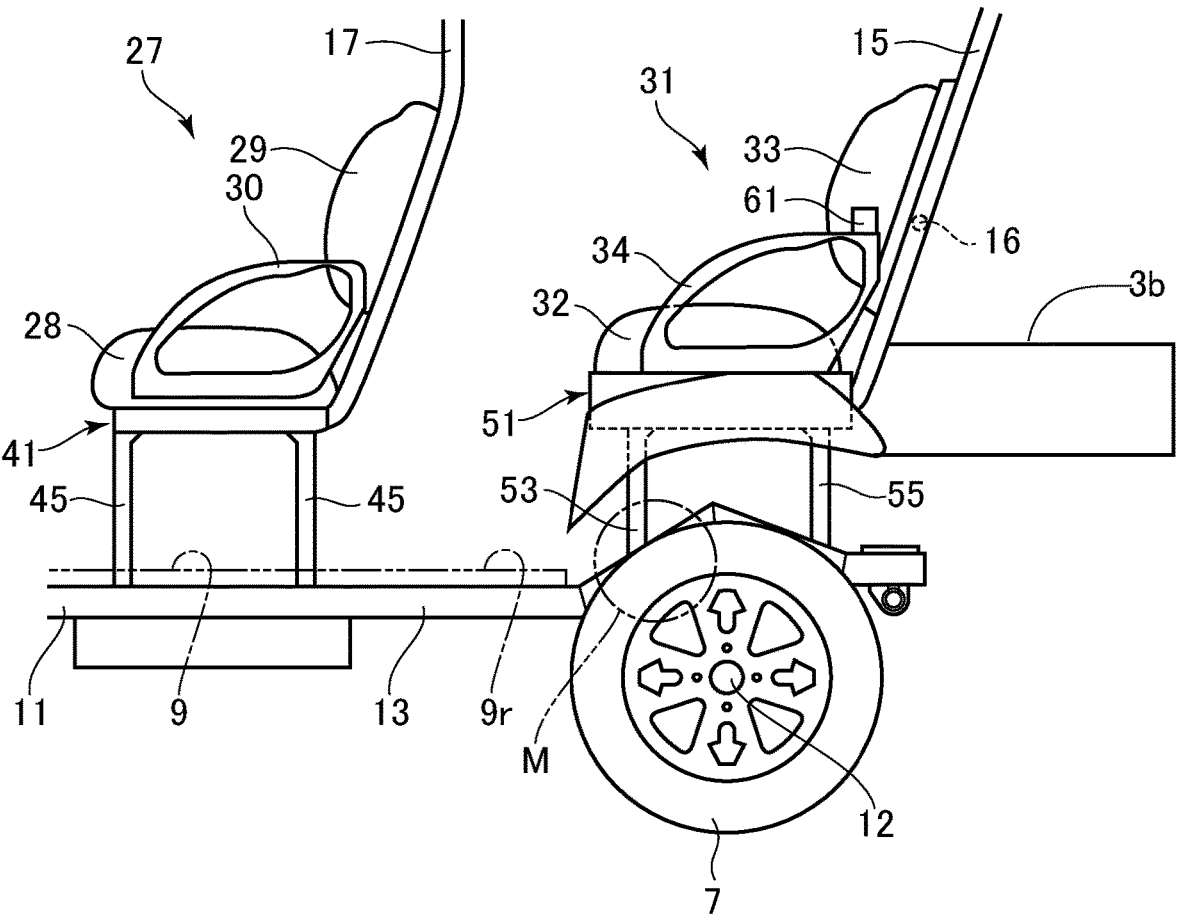
FIG. 2 is a schematic side view of the vicinity of a rear seat of the electric cart according to a first embodiment.

An overall schematic structure of an electric cart 1 as an electric passenger transport vehicle according to a first embodiment is described below with reference to FIGS. 1 and 2. FIG. 1 is a side view of the electric cart 1 according to a first embodiment. FIG. 2 is a schematic side view of the vicinity of a rear seat 31 of the electric cart 1. Assume that directions in the disclosure matches directions viewed from a driver of the utility vehicle 1.

As illustrated in FIG. 1, the electric cart 1 is an electric cart 1 that includes two rows of seats, including a front seat and a rear seat. The electric cart 1 includes a vehicle body 3, a pair of left and right front wheels 5 provided at a front portion of the vehicle body 3, and a pair of left and right rear wheels 7 provided at a rear portion of the vehicle body 3. The vehicle body 3 includes a vehicle body main frame 11 provided below a floor panel 9 of the vehicle body 3. The main frame 11 includes, for example, left and right frame members 13 (see FIG. 2) extending in a longitudinal direction of the vehicle body, and cross members (not illustrated) connecting the left and right frame members 13 at a front end portion, a rear end portion, and a central portion thereof. The front wheels 5 and the rear wheels 7 are rotatably attached to the main frame 11 via suspensions or the like. The driving force of an electric motor M (see FIG. 2) attached to the main frame 11 at the vicinity of the rear wheels 7 rotates the rear wheels 7 via a transmission (not illustrated) and a rear axle 12 (see FIG. 2). As a result, the electric cart 1 can travel forward or backward.

The vehicle body 3 includes left and right front pillars 14 connected to the front end portion of the main frame 11, left and right rear pillars 15 connected to the rear end portion of the main frame 11, and left and right intermediate pillars 17 connected to the intermediate portion of the main frame 11 in the longitudinal direction of the vehicle. Top beams 19 are connected to upper ends of the pillars 14, 15, and 17. The vehicle 1 also includes a cargo bed 3b in the back of the vehicle body 3.

A front cover 21 is provided at a front end portion of the vehicle body 3. A dashboard 22 serving as a front end of a passenger space 4 is provided behind the front cover 21. The dashboard 22 is provided with drink holders (not illustrated) and the like.

A rear cover 23 (indicated by double-dotted line in FIG. 1) is provided at a rear end portion of the vehicle body 3. A front portion of the rear cover 23 functions as a rear seat cover portion 23a, and a rear portion of the rear cover 23 functions as a rear cowl portion 23b. A storage 25 (see FIGS. 18-20) is provided at and recessed from a rear end portion of the rear cowl portion 23b. The storage 25 is exposed to the outside of the vehicle.

A front portion of the passenger space 4 is provided with a bench-type front seat 27 serving as a first seat and a rear portion of the passenger space 4 is provided with a bench-type rear seat 31 serving as a second seat. The front seat 27 includes a left side seating area at a left side thereof that serves as a driver's seat. An operation unit including a steering wheel 35, an accelerator 37, a brake 39, a start switch, a changeover switch, and the like is provided in front of the left side seating area.

The front seat 27 includes a seat bottom 28 and a seat back (backrest) 29. The front seat bottom 28 is fixed to an upper surface of a front seat base 41, which is projected upward from the floor 9. The front seat base 41 includes left and right front seat posts 43 and left and right rear seat posts 45, as illustrated in FIG. 2. Each front seat post 43 and each rear seat post 45 are fixed to the main frame 11, extend upward from the main frame 11, and protrude above the floor 9. The front seat base 41 also includes a front cross member (not illustrated) that connects upper ends of the left and right front seat posts 43, and a rear cross member (not illustrated) that connects upper ends of the left and right rear seat posts 45, and plural bars (not illustrated) each of which connects the front cross member and the rear cross member. The front seat bottom 28 is fixed to the upper end portion of the seat base 41 configured as described above. Note that the front seat base 41 is covered with a cover 42 (front seat base cover) on a front surface, left and right side surfaces, and rear surface thereof.

The front seat back 29 is attached to the intermediate pillars 17 and positioned above the rear end portion of the front seat bottom 28.

The rear seat 31 is located in back of the front seat 27 across a rear seat passenger passage (floor surface 9r for the rear seat passengers). The rear seat 31 includes a seat bottom 32 and a seat back (backrest) 33. The rear seat bottom 32 is fixed to an upper surface of a rear seat base 51, which is projected upward from the floor 9. Further, the rear seat back 33 is supported by a rear cross bar 16 that connects middle portions of the left and right rear pillars 15 in the height direction.

The rear seat base 51 includes left and right front seat posts 53 and left and right rear seat posts 55, as illustrated in FIG. 2. Each of the front seat posts 53 and the rear seat posts 55 is fixed to the main frame 11 and protrudes upward from the main frame 11 so as to protrude above the floor 9. The rear seat base 51 includes a front cross member (not illustrated) that connects upper ends of the left and right front seat posts 53, and a rear cross member (not illustrated) that connects upper ends of the left and right rear posts 55, plural (for example, four) bars (not illustrated) each of which connects the front cross member and the rear cross member, a panel member 59 (see FIGS. 7 and 8) fixed to the plurality of bars and constituting an upper surface 51a (see FIGS. 7 and 8) of the rear seat base 51. The rear seat bottom 32 is attached to the upper surface 51a of the rear seat base 51 configured as described above. Specifically, the bottom surface of the rear seat bottom 32 is attached to the upper surface 51a of the rear seat base 51 in such a manner that a bottom surface 32b of the rear seat bottom 32 overlaps the upper surface 51a of the rear seat base 51 in the state where the bottom surface of the rear seat bottom 32 faces downward.

Note that no doors are provided on the left and right sides of the vehicle body 3. In other words, in the cross section of the front seat 27 taken along the vehicle width direction, the outer end of the floor panel 9 is located on the outermost side of the vehicle body 3. Further, an upper surface (seating surface) of the rear seat bottom 32 is located higher than an upper surface (seating surface) of the front seat bottom 28.

[Expansion Structure of Loading Section]

Figure 3:
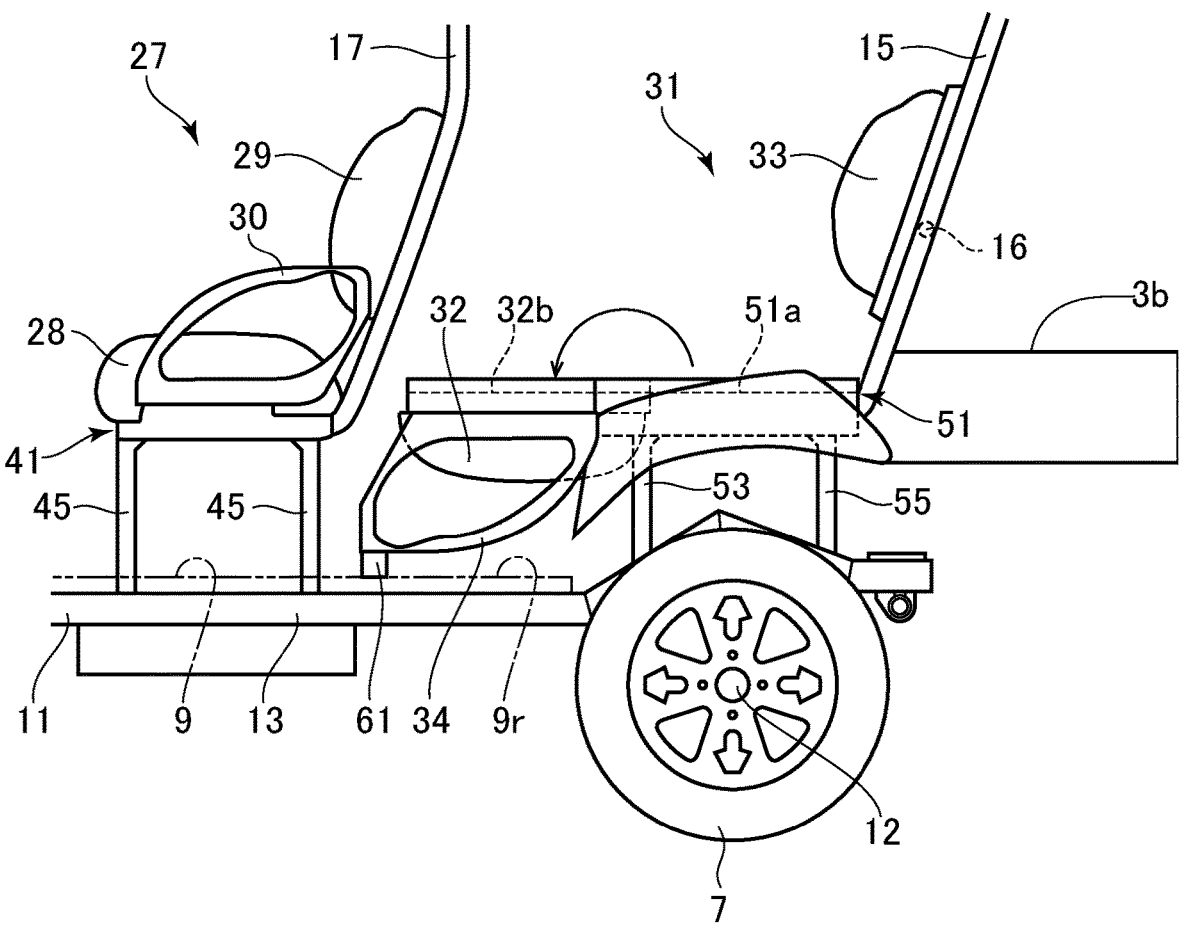
FIG. 3 is a schematic side view of the vicinity of the rear seat of the electric cart according to a first embodiment, illustrating a state in which a rear seat bottom of the electric cart is developed forward to thereby form a loading section.
Figure 4:
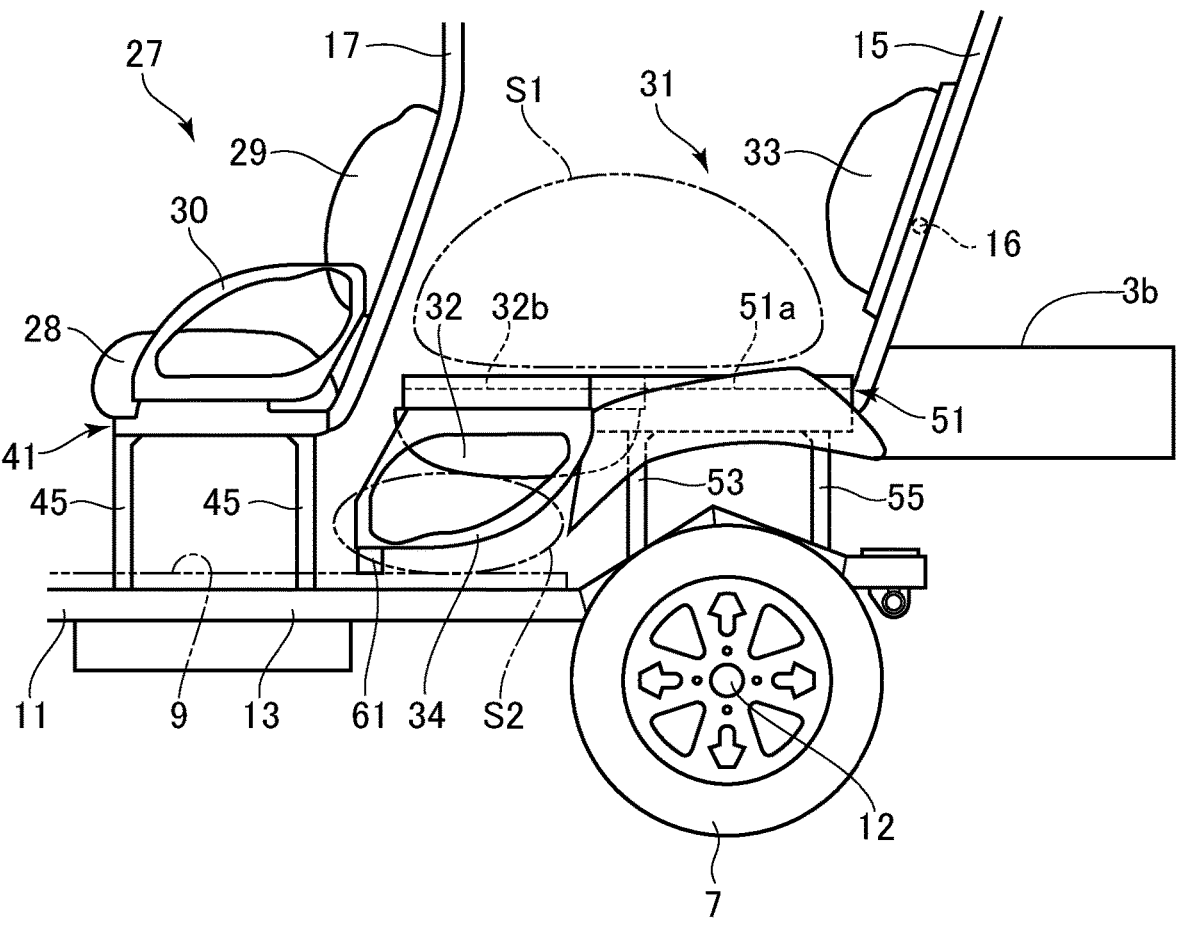
FIG. 4 is a diagram illustrating a loading space illustrated in FIG. 3 with a chain double-dashed line.
Figure 5:
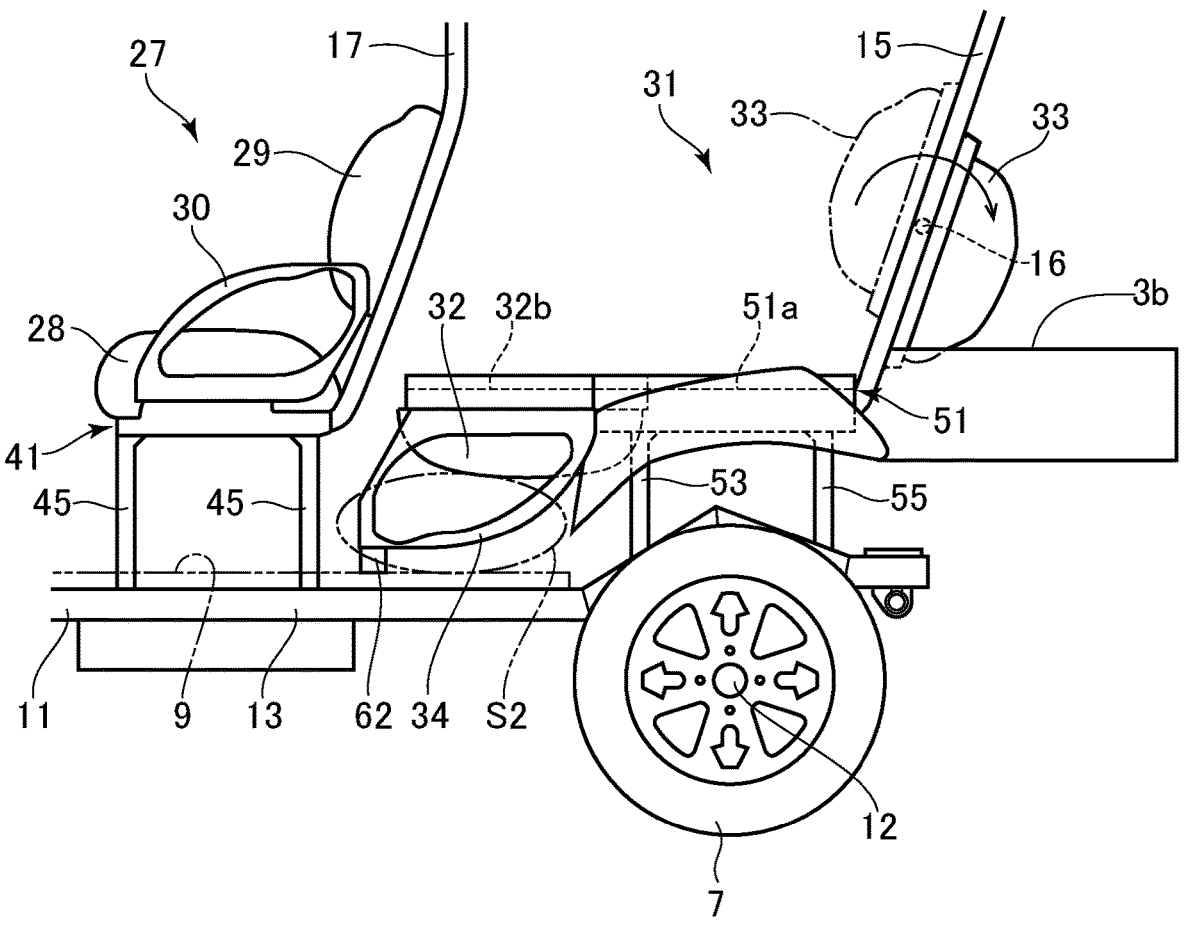
FIG. 5 is a schematic side view of the vicinity of the rear seat of the electric cart according to a first embodiment, illustrating a state in which the rear seat bottom of the electric cart is developed forward to thereby form the loading section and the rear seatback is developed rearward to thereby form a rear wall of the loading section.
Figure 6:
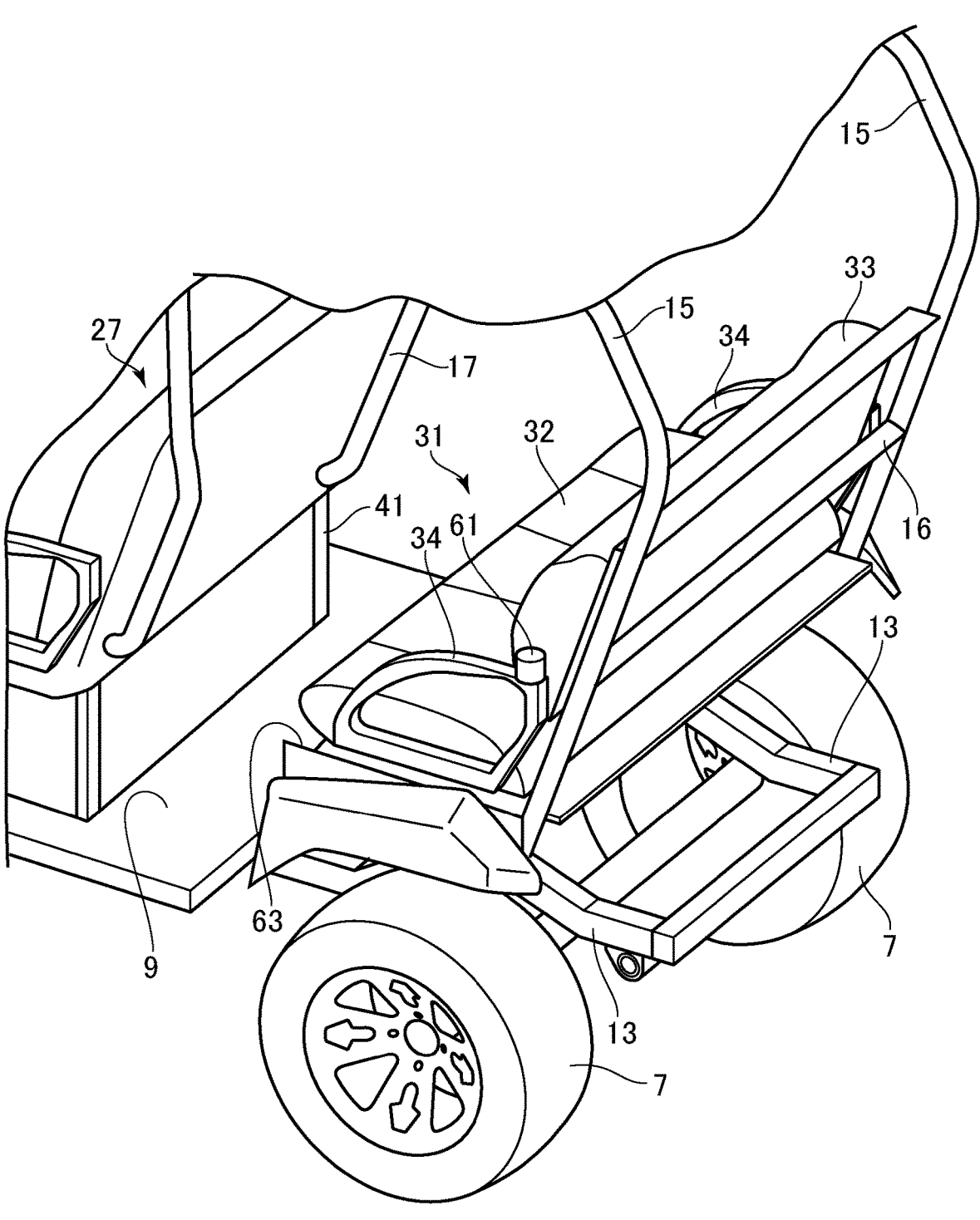
FIG. 6 is a schematic perspective view of a rear portion of the vehicle in a state illustrated in FIG. 2.
Figure 7:
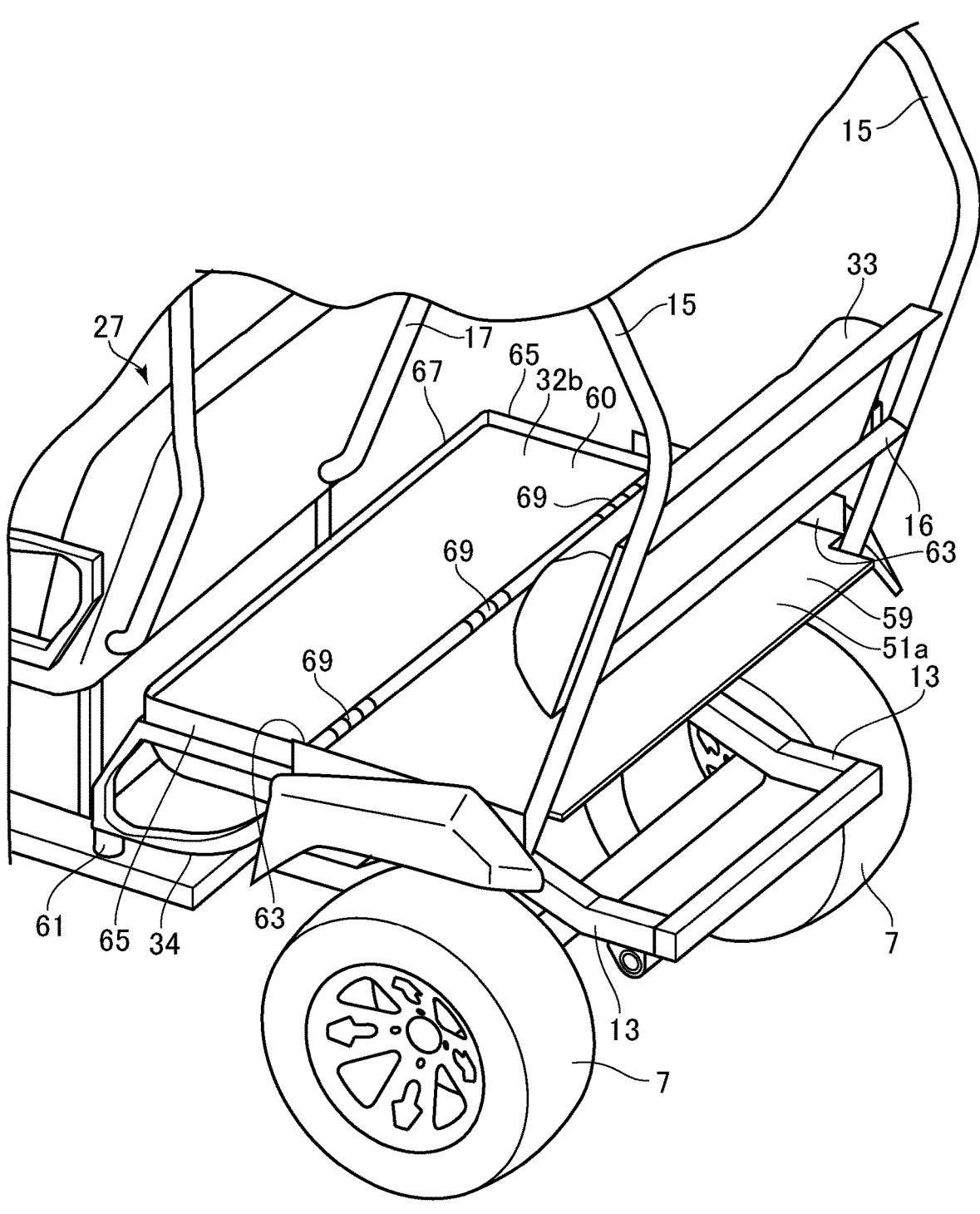
FIG. 7 is a schematic perspective view of the rear portion of the vehicle in a state illustrated in FIG. 3.
Figure 8:
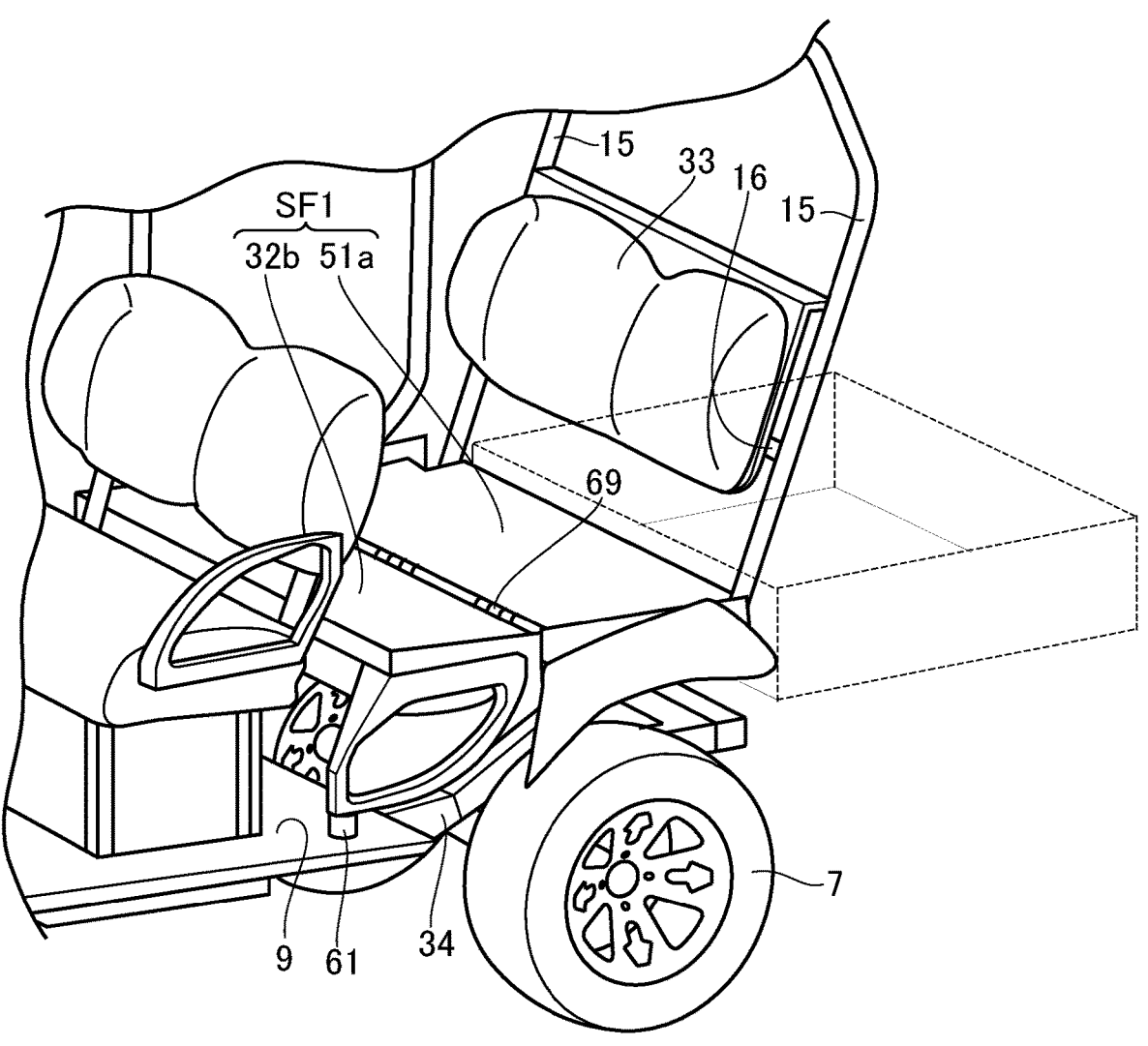
FIG. 8 is a schematic perspective view of the rear portion of the vehicle in the state illustrated in FIG. 3.
Figure 9:
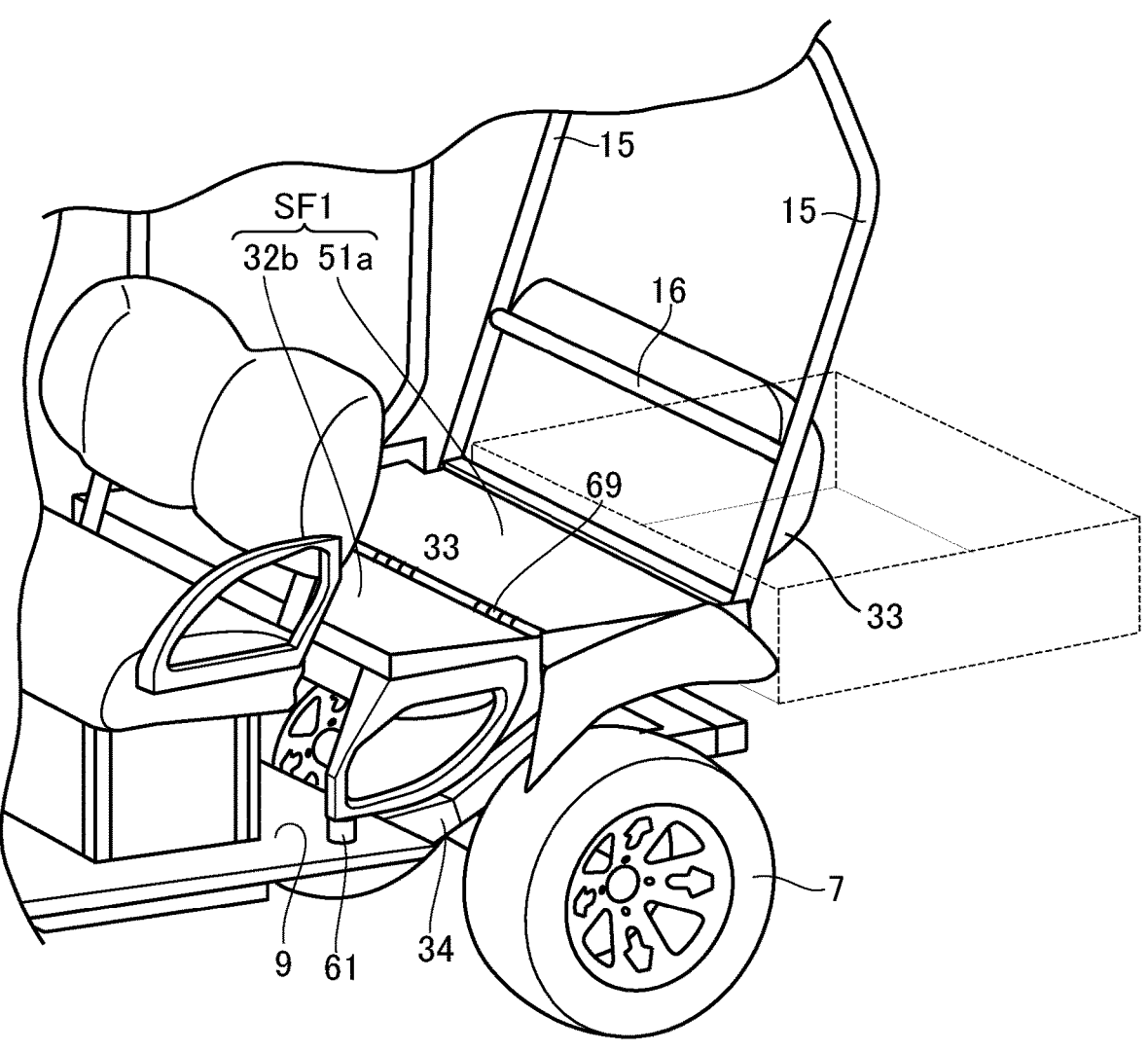
FIG. 9 is a schematic perspective view of the rear portion of the vehicle in a state illustrated in FIG. 5.

Next, an expansion structure of a loading section of the electric cart 1 is described with reference to FIGS. 2 to 9. FIGS. 2 to 5 are schematic side views of the vicinity of the rear seat 31 of the electric cart 1, wherein FIG. 2 illustrates a state in which the rear seat bottom 32 is positioned at a normal use position (a first position), and FIGS. 3 and 4 illustrate a state in which the rear seat bottom 32 is positioned at a developed position (a second position), and FIG. 5 illustrates a state where the rear seat bottom 32 is positioned at the developed position (the second position) and the rear seat back 33 is positioned at a developed position (a second position). FIG. 6 is a perspective view of the vicinity of the rear seat corresponding to FIG. 2, FIG. 7 is a perspective view of the vicinity of the rear seat corresponding to FIG. 3, FIG. 8 is another perspective view of the vicinity of the rear seat corresponding to FIG. 3, and FIG. 9 is a perspective view of the vicinity of the rear seat corresponding to the state of FIG. 5. In FIGS. 2 to 9, the front seat base cover 42, the rear cover 23, and other parts are omitted in order to explain the change in posture of the rear seat bottom 32 and the rear seat back 33.

In a first embodiment, the rear seat bottom 32 is supported by the vehicle body 3 (e.g., the rear seat base 51) in such a manner that the rear seat bottom 32 can be developed from the normal use position (the first position) illustrated in FIG. 2 to the developed position (the second position) illustrated in FIG. 3.

As a result, as illustrated in FIG. 3, the loading section (SF1) is formed by developing (flipping over) the rear seat bottom 32 to the front side of the rear seat base 51.

Specifically, as illustrated in FIG. 3, in the state where the rear seat bottom 32 is developed (flipped over) to the front side of the rear seat base 51, the bottom surface 32b of the rear seat bottom 32 faces upward and is positioned in front of the upper surface 51a of the rear seat base 51. In this state, the bottom surface 32b of the rear seat bottom 32 is substantially flush with the upper surface 51a of the rear seat base 51, and the bottom surface 32b of the rear seat bottom 32 and the upper surface 51a of the rear seat base 51 form the loading section (loading surface SF1).

More specifically, the front end of the upper surface 51a of the rear seat base 51 and the front end of the bottom surface 32b of the rear seat bottom 32 are connected by means of a hinge 69 (see FIG. 7), in such a manner that the rear seat bottom 32 is rotatably supported to the rear seat base 51. In the normal use position illustrated in FIGS. 2 and 6, the rear seat bottom 32 is fixed to the rear seat base 51 by a lock mechanism (not illustrated), but the lock mechanism can be released. When the lock mechanism is released, the rear seat bottom 32 can be moved about the hinge 69 from the normal use position illustrated in FIGS. 2 and 6 to the developed position (second position) illustrated in FIGS. 3 and 7.

Further, as illustrated in FIG. 4, when the rear seat bottom 32 is in the developed position (second position), a space S2 between the rear seat bottom 32 and the floor 9 can also be used as a loading space S2. Here, since armrests 34 are attached (fixed) to the left and right ends of the rear seat bottom 32 in a first embodiment, the armrests 34 are positioned on the left and right sides of the loading space S2 when the rear seat bottom 32 is at the developed position (FIGS. 3 and 4). Therefore, the armrests 34 attached to the left and right ends of the rear seat bottom 32 can prevent the luggage placed in the loading space S2 from falling off in the left-right direction of the vehicle.

Further, as illustrated in FIG. 2, the rear end portion of the upper edge of the armrest 34 is provided with a post 61 that is projected from the armrest 34 and has a cylindrical shape. Accordingly, as illustrated in FIGS. 3 and 4, in the developed position of the rear seat bottom 32, the posts 61 of the left and right armrests 34 of the rear seat bottom 32 function as contact portions 61 that contact the floor 9. As a result, the rear seat bottom 32 can be stably supported by the floor 9 when the rear seat bottom 32 is deployed to the developed position.

Also, the post 61 of the armrest 34 may become dirty due to contact with the floor panel 9. Therefore, the post 61 of the armrest 34 is provided at the position where it is difficult for the rear seat passenger to touch. In this example, the post 61 of the armrest 34 is provided at the rear end of the upper edge of the armrest 34 as described above.

Note that although the post 61 provided on the armrest 34 comes in contact with the floor 9 in this example, the armrest 34 may come in direct contact with the floor or the rear seat bottom 32 may be supported in the developed position (FIGS. 3 and 4) by contacting the armrest or the post with a portion of the vehicle body 3 other than the floor 9.

In a first embodiment, as illustrated in FIG. 7, the upper surface 51a of the rear seat base 51 is provided with flanges 63 projecting upward from the left and right edges thereof. Further, as illustrated in FIG. 7, in the state where the rear seat bottom 32 is in the developed position (in the state where the rear seat bottom 32 is flipped over), flanges 65 are provided at the left and right edges of the bottom surface 32b of the rear seat bottom 32 so as to protrude upward therefrom and a flange 67 is provided at the front edge of the bottom surface 32b of the rear seat bottom 32 so as to protrude upward therefrom. In other words, in the state where the rear seat bottom 32 is in the normal use position, the flanges 65 protrude downward from the left and right edges of the bottom surface 32b of the rear seat bottom 32 and the flange 67 protrudes downward from the rear edge of the bottom surface 32b of the rear seat bottom 32.

The flanges 63 of the upper surface 51a of the rear seat base 51 extend linearly in the front-rear direction of the vehicle along the left and right edges of the upper surface 51 of the rear seat base 51. The flanges 65 of the bottom surface 32b of the rear seat bottom 32 also extend linearly in the front-rear direction of the vehicle along the left and right edges of the bottom surface 32b of the rear seat bottom 32. The flange 67 of the bottom surface 32b of the rear seat bottom 32 extends linearly in the vehicle width direction along the front edge of the bottom surface 32b of the rear seat bottom 32 in the developed position of the rear seat bottom 32 (in the state where the rear seat bottom 32 is flipped over). That is, the flange portion 67 extends linearly in the vehicle width direction along the rear edge of the bottom surface 32b of the rear seat bottom 32 when the rear seat bottom 32 is in the normal use position.

With the flange 63 of the upper surface 51a of the rear seat base 51 and the flanges 65 and 67 of the bottom surface 32b of the rear seat bottom 32, the luggage placed on the loading surface SF1 can be prevented from falling from the loading surface SF1.

Further, in a first embodiment, the rear seat back 33 is rotatably supported by the vehicle body 3 (the rear crossbar 16 in this example) in such a manner that the rear seat back 33 is movable from a normal use position (a first position) illustrated in FIGS. 4 and 8 to a retracted position (a second position) illustrated in FIGS. 5 and 9. The rear seat back 33 is fixed to the rear pillars 15 by a lock mechanism (not illustrated) in the normal use position (first position) illustrated in FIGS. 4 and 8. When the lock mechanism is released, the rear seat back 33 can be rotated about the rear crossbar 16 so as to be movable to the retracted position (second position) illustrated in FIG. 9. At the retracted position of the rear seat back 33, the rear seat back 33 functions as an upright wall along the rear end of the loading surface SF1. In other words, although a gap exists between the rear seat back 33 and the loading surface SF1 in the normal use position of the rear seat back 33, the rear seat back 33 is configured, at the retracted position of the rear seat back 33, to close the gap. Accordingly, positioning the rear seat back 33 to the retracted position (FIGS. 5 and 9) when a low-height luggage is placed on the loading surface SF1 prevents the luggage from dropping from the loading surface SF1 to the rear side of the vehicle. In addition, since the rear seat back 33 at the retracted position thereof (FIGS. 5 and 9) is located further away from the front seat 27 than the rear seat back 33 at the normal use position thereof (FIGS. 4 and 8), the loading space S1 can be expanded in the longitudinal direction of the vehicle.

Effects of First Embodiment

Effects of a first embodiment are described below.

According to the electric cart 1 of a first embodiment, the rear seat 31 includes the seat bottom 32 attached to the upper surface 51a of the rear seat base 51 projecting from the floor 9, and the rear seat bottom 32 is movably supported with respect to the vehicle body 3 (e.g., the rear seat base 51) in such a manner that the rear seat bottom 32 is movable (e.g., rotatable) between the normal use position (the first position) illustrated in FIG. 2 and the developed position (the second position) illustrated in FIG. 3, in which the rear seat bottom 32 faces upward in front of the upper surface 51a of the rear seat base 51 and is substantially flush with the upper surface 51a of the rear seat base 51.

Therefore, by moving the rear seat bottom 32 from the normal use position (FIG. 2) to the developed position (FIG. 3), the rear seat bottom 32 is located in front of the upper surface 51a of the rear seat base 51 with the bottom surface 32b of the rear seat bottom 32 facing upward. As a result, the loading surface SF1 is formed by the bottom surface 32b (FIG. 3) of the developed rear seat bottom 32 and the upper surface 51a of the rear seat base 51. Therefore, it is possible to form the loading section (loading surface SF1) in the relatively small passenger space 4.

Further, in a first embodiment, the rear seat bottom 32 is rotatably supported with respect to the rear seat base 51 via the hinge 69. Therefore, the rear seat bottom 32 can be movably supported from the normal use position (FIG. 2) to the developed position (FIG. 3) with such a relatively simple structure.

Further, in a first embodiment, the flanges 65 and 67 projecting in the direction intersecting (substantially orthogonal to) the bottom surface 32b are provided on at least a part of the peripheral edge of the bottom surface 32b of the rear seat bottom 32 (see FIG. 7). With this, when the rear seat bottom 32 is turned upside down to thereby use the bottom surface 32b of the rear seat bottom 32 as the loading section (the loading surface SF1), the flanges 65 and 67 are formed around the loading surface SF1. These flanges 65 and 67 can prevent the luggage from falling off the loading surface SF1.

Further, in a first embodiment, the armrests 34 are fixed to the left and right end portions of the rear seat bottom 32. Therefore, when the rear seat bottom 32 is deployed to the developed position, the armrests 34 are located on the left and right sides of the loading space S2 generated between the rear seat bottom 32 and the floor 9, unlike a case where the rear seat armrests are fixed to the rear seat base 51. Therefore, the armrests 34 fixed to the left and right end portions of the rear seat bottom 32 can prevent the luggage from dropping out of the loading space S2 in the left and right directions of the vehicle.

Further, in a first embodiment, the armrest 34 of the rear seat 31 includes the contact portion 61 that directly or indirectly contacts the floor 9 in the developed position of the rear seat bottom 32 (see FIGS. 3 and 7). With this, the load of the rear seat bottom 32 can be supported by the floor 9 via the armrest 34 in the developed position of the rear seat bottom 32.

Further, in a first embodiment, the contact portion 61 of each armrest 34 is provided at the rear end portion of the upper edge of the armrest 34 in the normal use position of the rear seat bottom 32. With this, the contact portion 61 of the armrest 34, which may come into contact with the floor 9 and become dirty, is located at the position where the passenger (user) does not usually touch in the normal use position of the rear seat bottom 32.

Further, in a first embodiment, the rear seat back 33 is movably supported with respect to the vehicle body 3 (e.g., the rear crossbar 16) and the rear seat back 33 is movable to the retracted position (the second position) in which the rear seat back 33 is positioned away from the front seat 27 than the rear seat back 33 in the normal use position (the first position) (see FIG. 5). Therefore, by retracting the rear seat back 33 to the retracted position (FIG. 5), the loading space S1 can be expanded compared to the state where the rear seat back 33 is in the normal use position (FIG. 4).

Further, in a first embodiment, the rear seat back 33 functions as the upright wall along the rear end of the loading surface SF1 when the rear seat back 33 is in the retracted position (FIG. 5). That is, in the retracted position of the rear seat back 33, the rear seat back 33 is located at a position where there was the gap between the rear seat back 33 and the loading surface SF1 in the normal use position of the rear seat back 33 (FIG. 4). With this, when a low-height luggage is placed on the loading surface SF1, the rear seat back 33 in the retracted position (FIG. 5) can prevent the luggage from falling to the rear of the vehicle.

Modifications of First Embodiment

Figure 10:
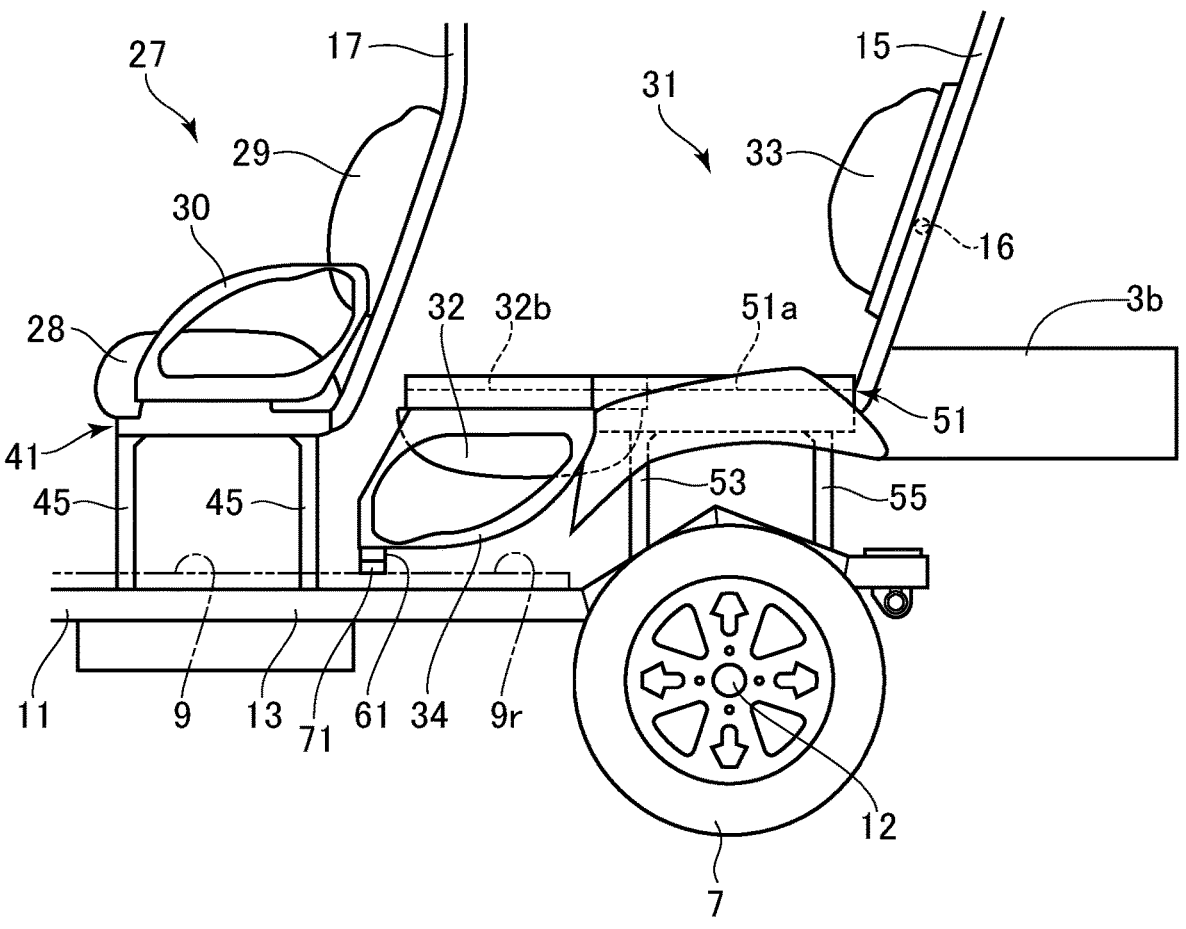
FIG. 10 is a schematic side view of the vicinity of a rear seat of an electric cart according to a first modification of a first embodiment.
Figure 11:
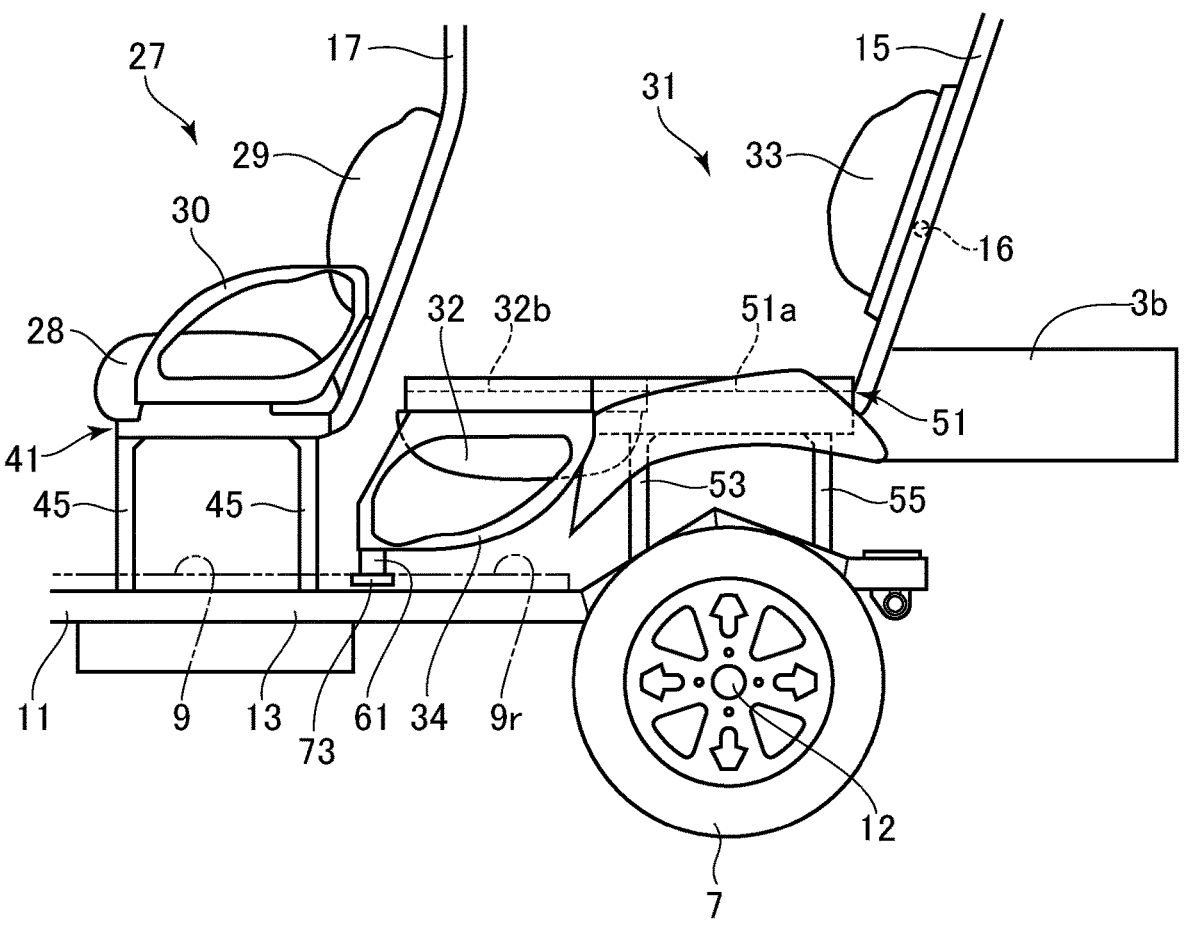
FIG. 11 is a schematic side view of the vicinity of a rear seat of an electric cart according to a second modification of a first embodiment.

FIG. 10 illustrates a first modification of a first embodiment, and FIG. 11 illustrates a second modification of a first embodiment. In a first modification illustrated in FIG. 10, a damper 71 as a cushioning material is attached to the tip of the post 61 as the contact portion of the armrest 34 fixed to the rear seat bottom 32. In a second modification illustrated in FIG. 11, a damper 73 as a cushioning material is embedded in a portion of the floor 9 that comes in contact with the tip of the post 61.

According to a first modification and a second modification, when the rear seat bottom 32 is moved from the normal use position (first position) to the developed position (second position), collision between the post 61 and the floor 9 can be softened. Moreover, the damper 71 or 73 can suppress rattling between the rear seat bottom 32 and the floor 9 at the developed position of the rear seat bottom 32.

In addition, the damper is provided on one of the contact portion 61 of the armrest 34 and the floor 9 in first and second modifications described above, but the damper may be provided on both.

Second Embodiment

Next, an electric cart 1 according to a second embodiment of the disclosure is described with reference to FIGS. 12 and 13.

A second embodiment differs from a first embodiment in the structure of the armrests 34 of the rear seat bottom 32 and differs from a first embodiment in the support structure for supporting the rear seat back 33.

Figure 12:
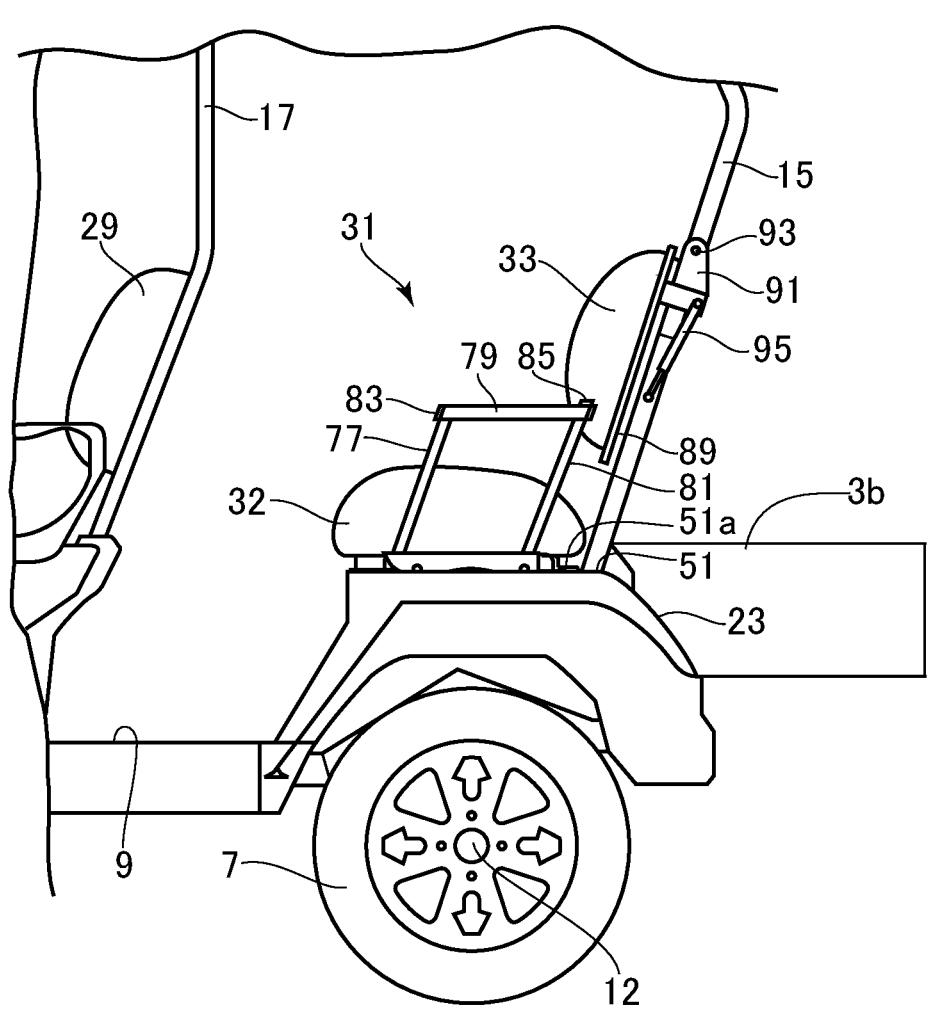
FIG. 12 is a schematic side view of the vicinity of a rear seat of an electric cart according to a second embodiment.

FIG. 12 is a schematic side view of the vicinity of a rear seat of the electric cart 1 according to a second embodiment, illustrating a state where a rear seat bottom 32 is in a normal use position (first position) and a rear seat back 33 is in a normal use position (first position). FIG. 13 is a schematic side view of the vicinity of the rear seat of the electric cart 1 according to a second embodiment, illustrating a state where the rear seat bottom 32 is in a developed position (second position) and the rear seat back 33 is in a retracted position (second position).

First, the structure of an armrest 34 of the rear seat bottom 32 according to a second embodiment is described. As illustrated in FIG. 12, the armrest 34 of the rear seat bottom 32 according to a second embodiment is formed in a quadrangular shape, more specifically, in a substantially parallelogram shape. The armrest 34 includes a front member 77, an upper member 79, and a rear member 81, each of which is formed linearly, in such a manner that the front member 77, the upper member 79, the rear member 81, and an armrest base 75 form the quadrangular (parallelogram) shape. The armrest base 75 is fixed to both left and right end portions of the bottom surface 32b of the rear seat bottom 32. The armrest base 75 extends substantially parallel to the bottom surface 32b of the rear seat bottom 32. An upper surface of the upper member 79 of the armrest 34 is provided substantially parallel to the bottom surface 32b of the rear seat bottom 32. The upper surface of the upper member 79 of the armrest 34 is substantially parallel to the floor 9 and parallel to the upper surface 51a (see FIG. 13) of the seat base 51 when the rear seat bottom 32 is in the normal use position illustrated in FIG. 12. A damper 83 is attached to the front surface of the front end portion of the upper member 79 of the armrest 34, and a damper 85 is attached to the upper surface of the rear end portion of the upper member 79 of the armrest 34.

Figure 13:
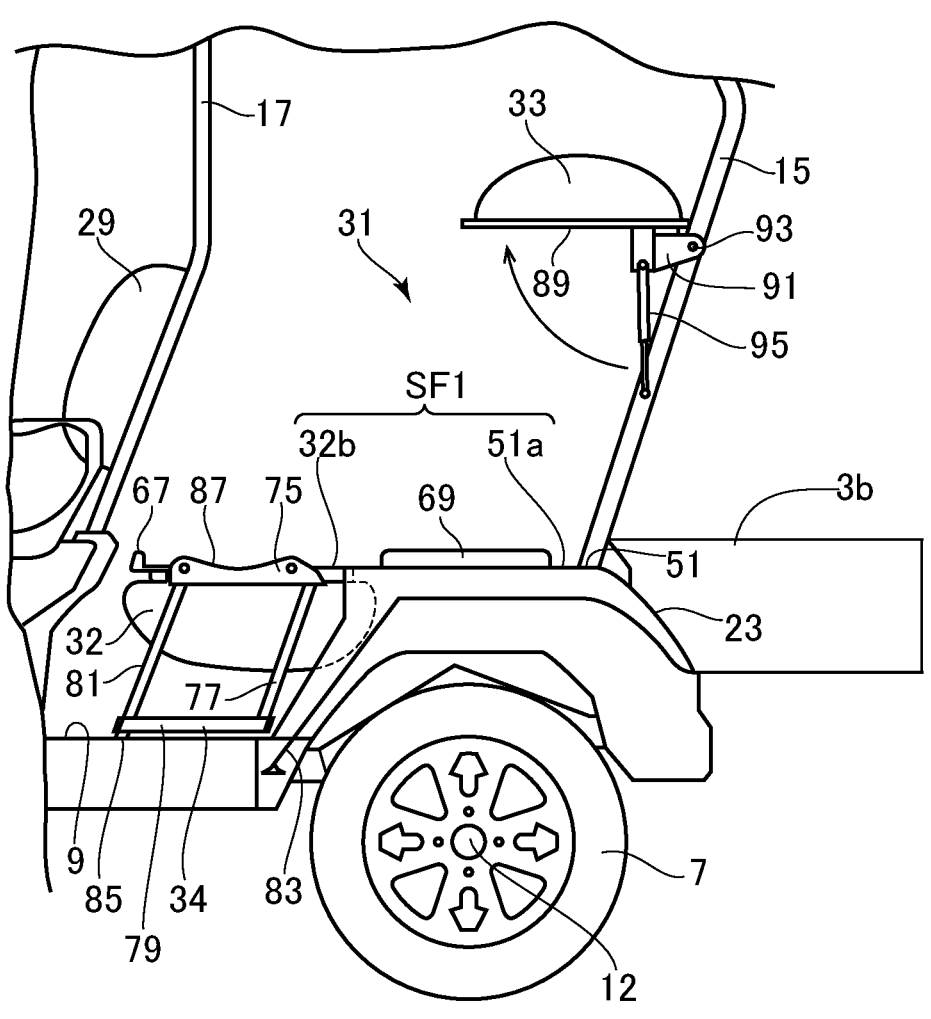
FIG. 13 is a schematic side view of the vicinity of the rear seat of the electric cart according to a second embodiment, illustrating a state in which a rear seat bottom is developed forward so as to form a loading section and a rear seat back is developed upwardly forward.

When the rear seat bottom 32 is turned over from the normal use position of the rear seat bottom 32 illustrated in FIG. 12 to the developed position of the rear seat bottom 32 illustrated in FIG. 13, the bottom surface 32b of the rear seat bottom 32 is substantially flush with the upper surface 51a of the rear seat base 51. With this, the loading surface SP1 is formed. In this state, the upper surface of the upper member 79 of the armrest 3 is in contact with or in the vicinity of the floor 9 with the upper surface of the upper member 79 of the armrest 34 being in parallel with the floor 9, the dumper 85 attached to the upper member 79 is in contact with the floor 9, and the dumper 83 attached to the upper member 79 is in contact with the front end portion of the rear cover 23.

Further, the armrest base 75 includes a flange portion 87 (FIG. 13). In the developed position of the rear seat bottom 32 illustrated in FIG. 13, the flange portions 87 protrude from both ends, in the left and right directions of the vehicle, of the loading surface SF1. With this, the luggage placed on the loading surface SF1 can be prevented from falling off in the left and right directions of the vehicle.

Next, a support structure for supporting the rear seat back 33 according to a second embodiment is described with reference to FIGS. 12 and 13. In a second embodiment, the rear seat back 33 can be retracted from the normal use position (first position) illustrated in FIG. 12 to the retracted position (second position) illustrated in FIG. 13. That is, the rear seat back 33 is supported by the rear pillars 15 in such a manner that the rear seat back 33 can be retracted toward a forwardly-upward side from the normal use position (FIG. 12).

A specific support structure for the rear seat back 33 is as follows. A base plate 89 is attached to the rear surface of the rear seat back 33. The upper end portion of the base plate 89 is provided with brackets 91 at positions corresponding to the left and right rear pillars 15. Each bracket 91 is rotatably attached to the rear pillar 15 by a pin 93. That is, the rear seat back 33 is supported by the vehicle body (the rear pillar 15) so as to be rotatable about the pin 93 functioning as a rotation axis. Further, a biasing device 95 including a compression spring is connected between the bracket 91 and the rear pillar 15. Therefore, when the rear seat back 33 is positioned on a side closer to the normal use position than a change point (not illustrated) that is located between the normal use position (FIG. 12) and the retracted position (FIG. 13), the biasing device 95 biases the rear seat back 33 toward the normal use position. With this, the rear seat back 33 comes into contact with a stopper (not illustrated) provided on the rear pillar 15 and stops at the normal use position. On the other hand, when the rear seat back 33 is positioned on a side closer to the retracted position than the change point (not illustrated), the biasing device 95 biases the rear seat back 33 toward the retracted position, and the rear seat back 33 stops at the retracted position.

With such a structure, when the user rotates the rear seat back 33 located at the normal use position from the normal use position (FIG. 12) toward the retracted position (FIG. 13) against the biasing force of the biasing device 95 and then the rear seat back 33 passes over the change point, the rear seat back 33 is moved to the retracted position (FIG. 13) by means of the biasing force of the biasing device 95 and stops at the retracted position. Therefore, in a second embodiment, as illustrated in FIG. 13, by retracting the rear seat back 33 to the retracted position higher than the normal use position, a relatively tall luggage can be put on the loading surface SF1 from the rear side of the electric cart 1. Further, in a case where the luggage to be placed on the loading surface SF1 is long in the longitudinal direction of the vehicle, the luggage can be placed on the loading surface SF1 with a part of which protrudes rearward from the loading surface SF1.

Effects of Second Embodiment

Next, effects of a second embodiment are described. Note that descriptions of the same or similar effects based on the same or similar configurations as in a first embodiment are omitted in order to avoid redundancy.

In a second embodiment, the rear seat back 33 is supported by the vehicle body (for example, the rear pillars 15) in such a manner that the rear seat back is movable between the normal use position (see FIG. 12) in which the rear seat back 33 is positioned above the rear end of the rear seat bottom 32 and functions as the backrest for the passenger seated on the rear seat bottom 32 and the retracted position (FIG. 13) above the normal use position (see FIG. 12). Accordingly, by retracting the rear seat back 33 to the retracted position (FIG. 13), which is higher than the normal use position (see FIG. 12), a relatively tall luggage can be put onto the loading surface SF1 from the rear side of the electric cart 1. Further, in a case where the luggage to be placed on the loading surface SF1 is long in the longitudinal direction of the vehicle, the luggage can be placed on the loading surface SF1 with a part of which protrudes rearward from the loading surface SF1.

Further, in a second embodiment, the rear seat back 33 is rotatably supported by the rear pillar 15 as a part of the vehicle body 3 so as to be movable between the normal use position (FIG. 12) and the retracted position (FIG. 13) above the normal use position. Accordingly, the rear seat back 33 can be movably supported between the normal use position (FIG. 12) and the retracted position (FIG. 13) with a simple structure without adding any other structures.

Further, in a second embodiment, a part of the vehicle body (the rear pillars 15) and the rear seat back 33 are connected with the biasing device 95, and the biasing device 95 is configured to bias the rear seat back 33 toward the normal use position (FIG. 12) when the rear seat back 33 is closer to the normal use position (FIG. 12) than the change point and to bias the rear seat back 33 toward the retracted position (FIG. 13) when the back 33 is closer to the retracted position (FIG. 13) than the change point. Accordingly, the rear seat back 33 can be stabilized at the normal use position (FIG. 12) or the retracted position (FIG. 13) with such a relatively simple structure.

Further, in a second embodiment, the armrests 34 of the rear seat 31 include the flange portions 87 protruding, in the direction substantially orthogonal to the bottom surface 32b, from the vicinity of both left and right end portions of the bottom surface 32b of the rear seat bottom 32. With this, when the rear seat bottom 32 is positioned at the developed position (FIG. 13) to form the loading surface SF1, the flange portions 87 of the armrests 34 exhibit the function of preventing the load from falling off. Therefore, the flange portions 87 having the fall-off prevention function are formed without providing flange portions on the left and right ends of the bottom surface 32b of the rear seat bottom 32.

[Modification of Support Structure for Rear Seat Back]

Figure 14:
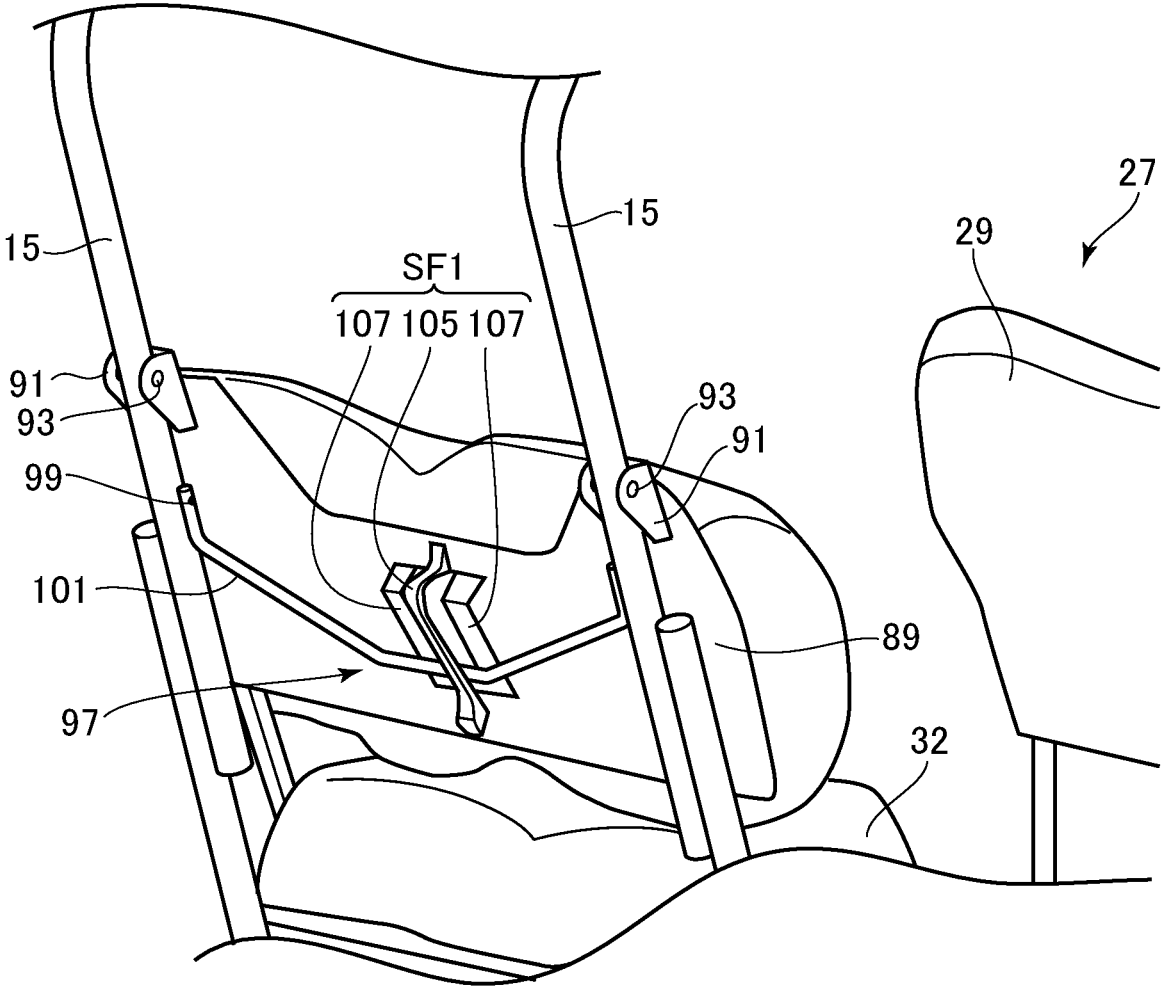
FIG. 14 is a schematic perspective view of a modification of a support structure for the rear seat back according to a second embodiment, illustrating the rear seat back in a normal use position thereof.
Figure 16:
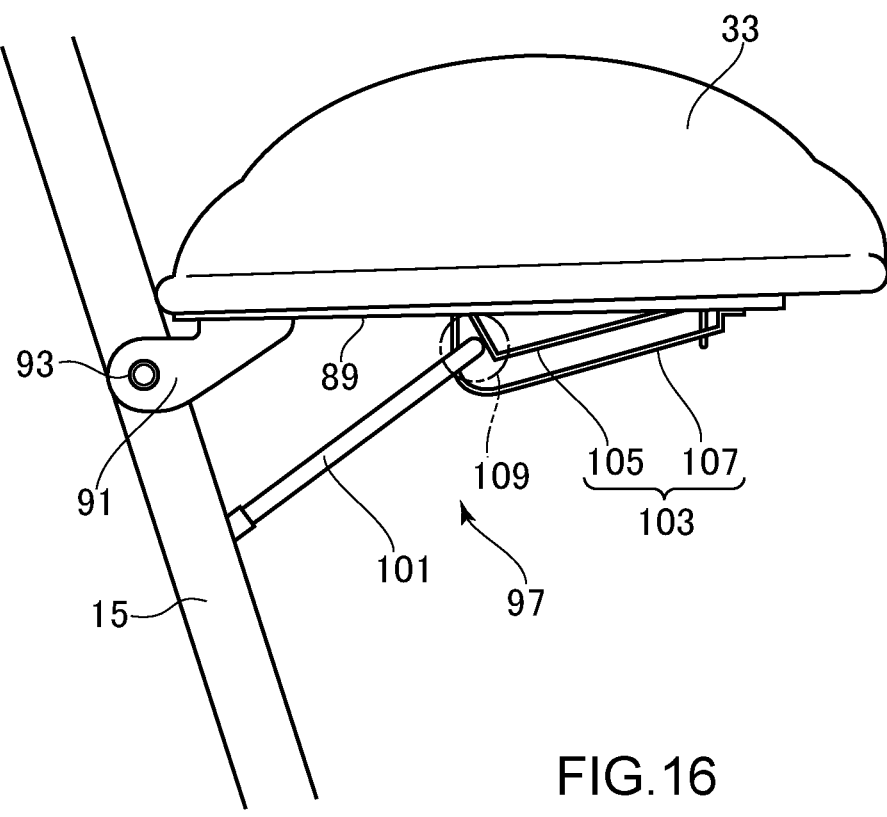
FIG. 16 is a schematic side view of the modification of the support structure for the rear seat back according to a second embodiment, illustrating the rear seat back in the retracted position thereof.
Figure 17:
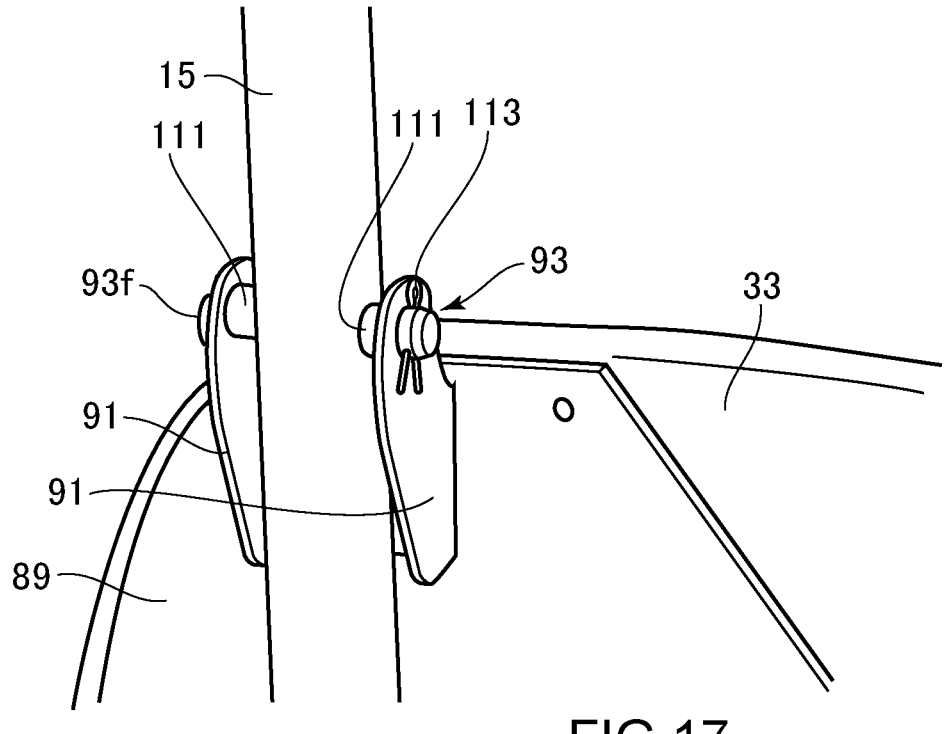
FIG. 17 is an enlarged perspective view of a part of the modification of the support structure for the rear seatback according to a second embodiment.

Next, a support structure for supporting the rear seat back 33 according to a modification of a second embodiment is described with reference to FIGS. 14 to 17. FIG. 14 is a perspective view illustrating the rear seat back 33 at the normal use position, FIG. 15 is a perspective view illustrating the rear seat back 33 at the retracted position, FIG. 16 is a side view illustrating the rear seat back 33 at the retracted position, and FIG. 17 is an enlarged perspective view of a part of the support structure for supporting the rear seat back.

A modification illustrated in FIGS. 14 to 17 differs from a second embodiment in that a holding mechanism 97 is provided instead of the biasing device 95 of a second embodiment. Specifically, as illustrated in FIG. 14, the holding mechanism 97 includes a rotary bar 101 held by the rear pillar 15 so as to be rotatable about a rotational shaft 99, a slide rail portion 103 that is fixed to the base plate 89 of the rear seat back 33 and configured to guide the rotary bar 101. The slide rail portion 103 includes a first guide plate 105 provided substantially in the center of the rear seat back 33 in the left-right direction, and a pair of second guide plates 107 provided on the left and right sides of the first guide plate 105. The rotary bar 101 supported by the rear pillar 15 is inserted in the slide rail portion 103 formed by the first guide plate 105 and the second guide plate 107.

Figure 15:
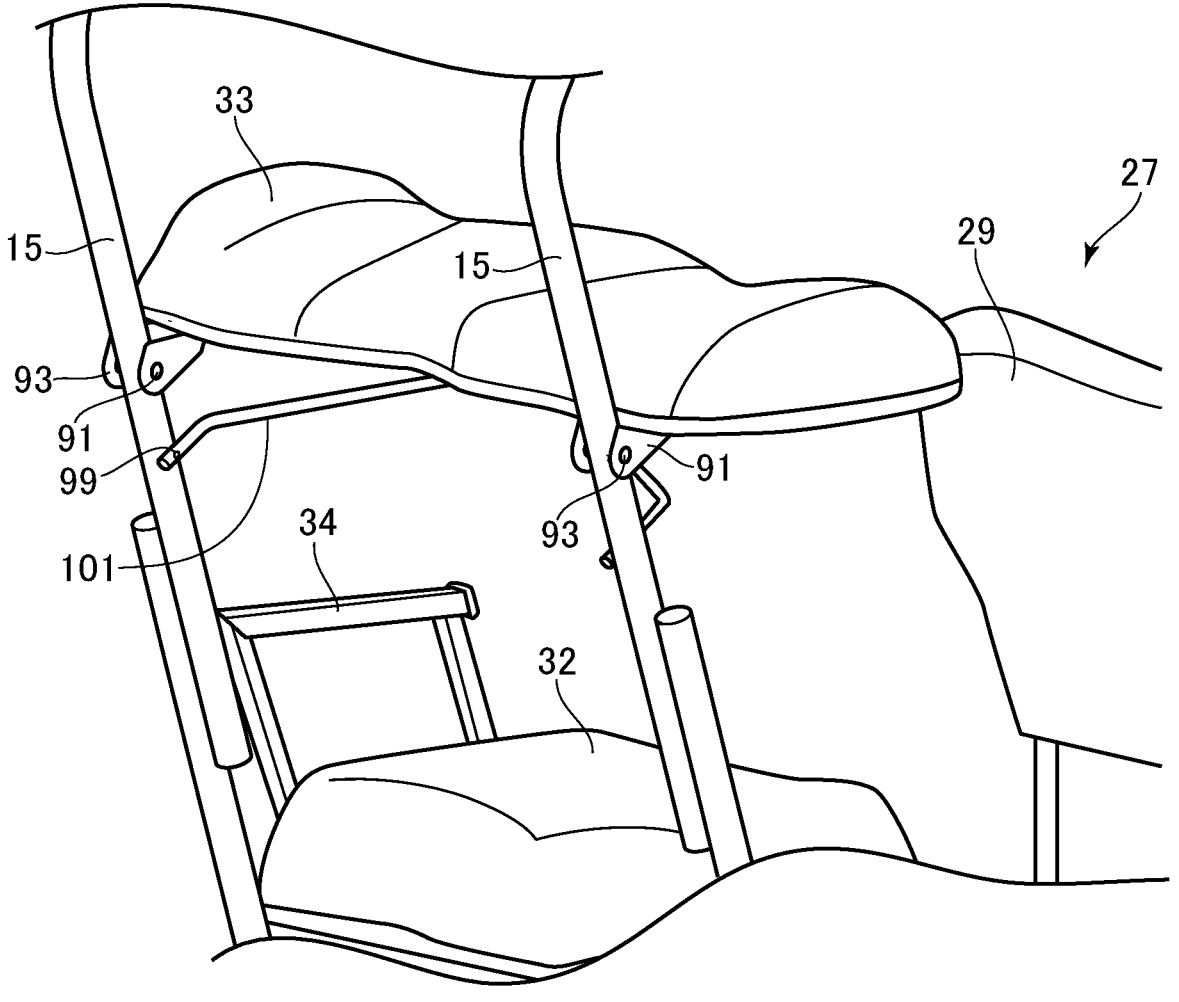
FIG. 15 is a schematic perspective view of the modification of the support structure for the rear seat back according to a second embodiment, illustrating the rear seat back in a retracted position thereof.

As illustrated in FIGS. 14 and 15, when the user rotates the rear seat back 33 from the normal use position (FIG. 14) to the retracted position (FIG. 15), or from the retracted position (FIG. 15) to the normal use position (FIG. 14), the rotary bar 101 moves in the slide rail portion 103 while rotating about the rotational shaft 99.

In the normal use position of the rear seat back 33 illustrated in FIG. 14, the base plate 89 of the rear seat back 33 abuts against stoppers (not illustrated) provided on the rear pillars 15, and thus the rear seat back 33 is stabilized in the normal use position (FIG. 14) due to the weight of the rear seat back 33.

On the other hand, in the retracted position of the rear seat back 33 illustrated in FIG. 15, the rotation bar 101 is held by a holding section 109 (see FIG. 16) defined by the curved end portion of the slide rail portion 103, to thereby stop rotation of the bar 101 and rotation of the rear seat back 33. With this, the rear seat back 33 is stabilized against the weight thereof at the retracted position of the rear seat back 33. In this modification, with such a structure, the rear seat back 33 can be retracted and stopped at the retracted position (FIG. 15) higher than the normal use position (FIG. 14).

Further, as illustrated in FIG. 17, the pin 93 functioning as the rotational axis 93 of the rear seat back 33 passes through a boss 111 projecting from the bracket 91 and a through hole (not illustrated) provided in the rear pillar 15. The pin 93 is prevented from coming off the boss 111 and the through hole, by means of a flange portion 93f provided at one end of the pin 93 and a snap pin 113 inserted into a through hole provided at the other end of the pin 93.

With such a configuration, the rear seat back 33 can be removed from the rear pillar 15 by removing the snap pin 113 from the pin 93 and further removing the pin 93 from the rear pillar 15. Similarly, the rotational shaft 99 of the rotary 101 may also be attached to the rear pillar 15 with a snap pin (not illustrated) or the like, and the rotary bar 101 may also be removed from the rear pillar by removing the snap pin (not illustrated) or the like.

Thus, in the modification illustrated in FIGS. 14 to 17, the rear seat back 33 can be held at the retracted position by the holding mechanism 97.

[Modification of Loading Surface SF1]

Figure 18:
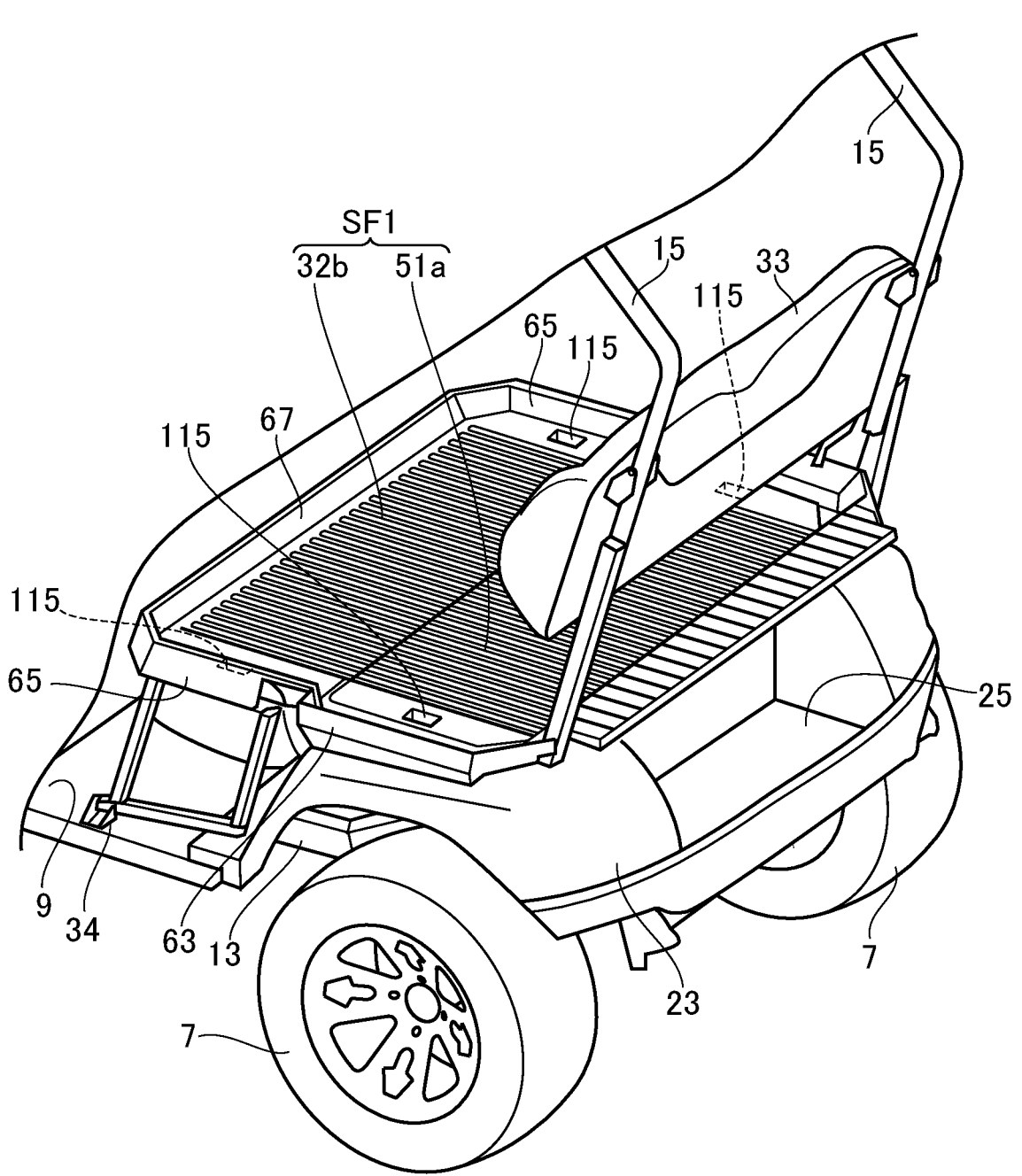
FIG. 18 is a schematic perspective view of the vicinity of the rear seat of the electric cart according to a modification of a second embodiment, illustrating a state in which the loading section is formed.
Figure 19:
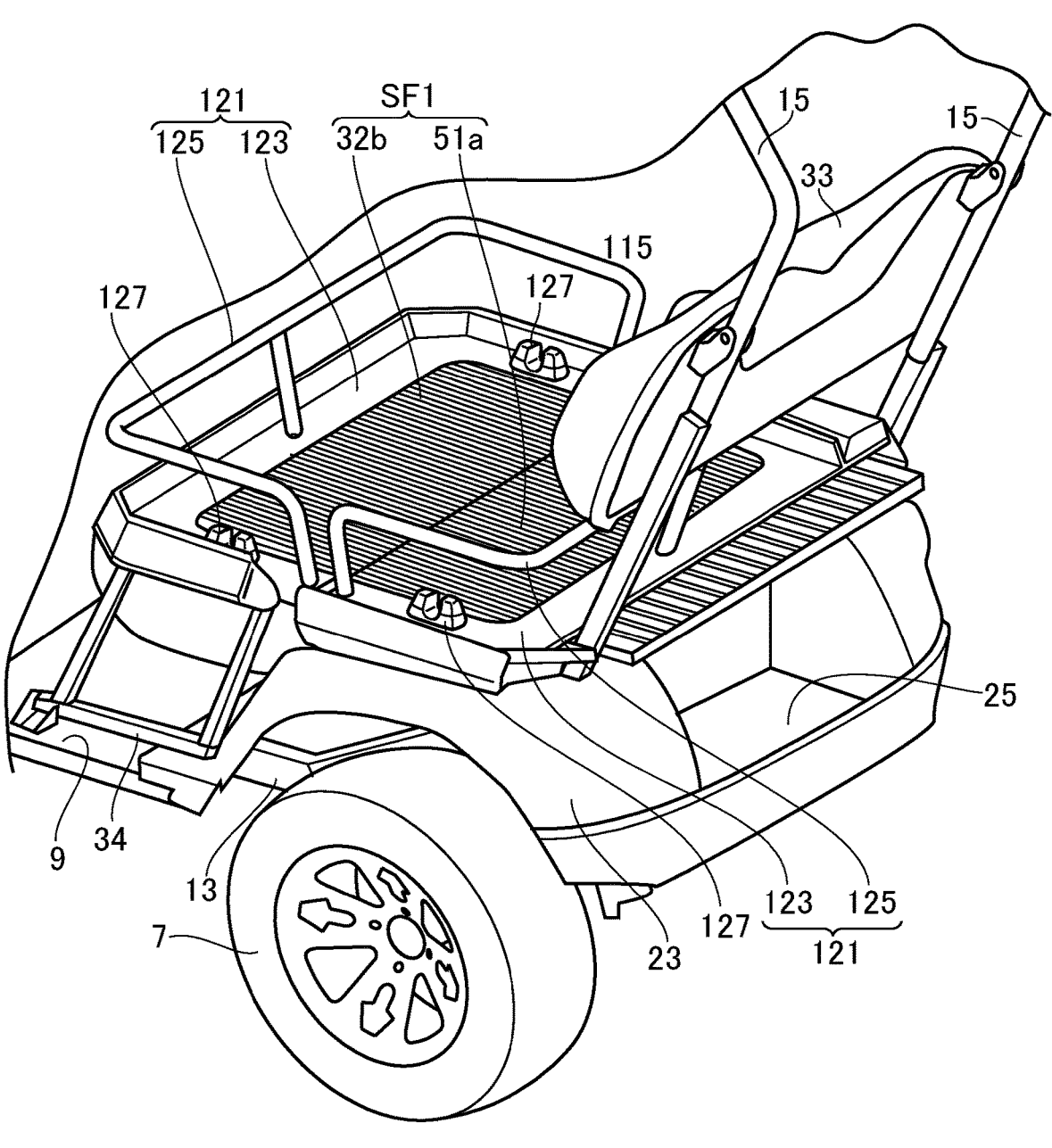
FIG. 19 is a schematic perspective view of the vicinity of the rear seat of the electric cart according to a modification of a second embodiment, illustrating a state in which a first accessory is attached to the formed loading section.
Figure 20:
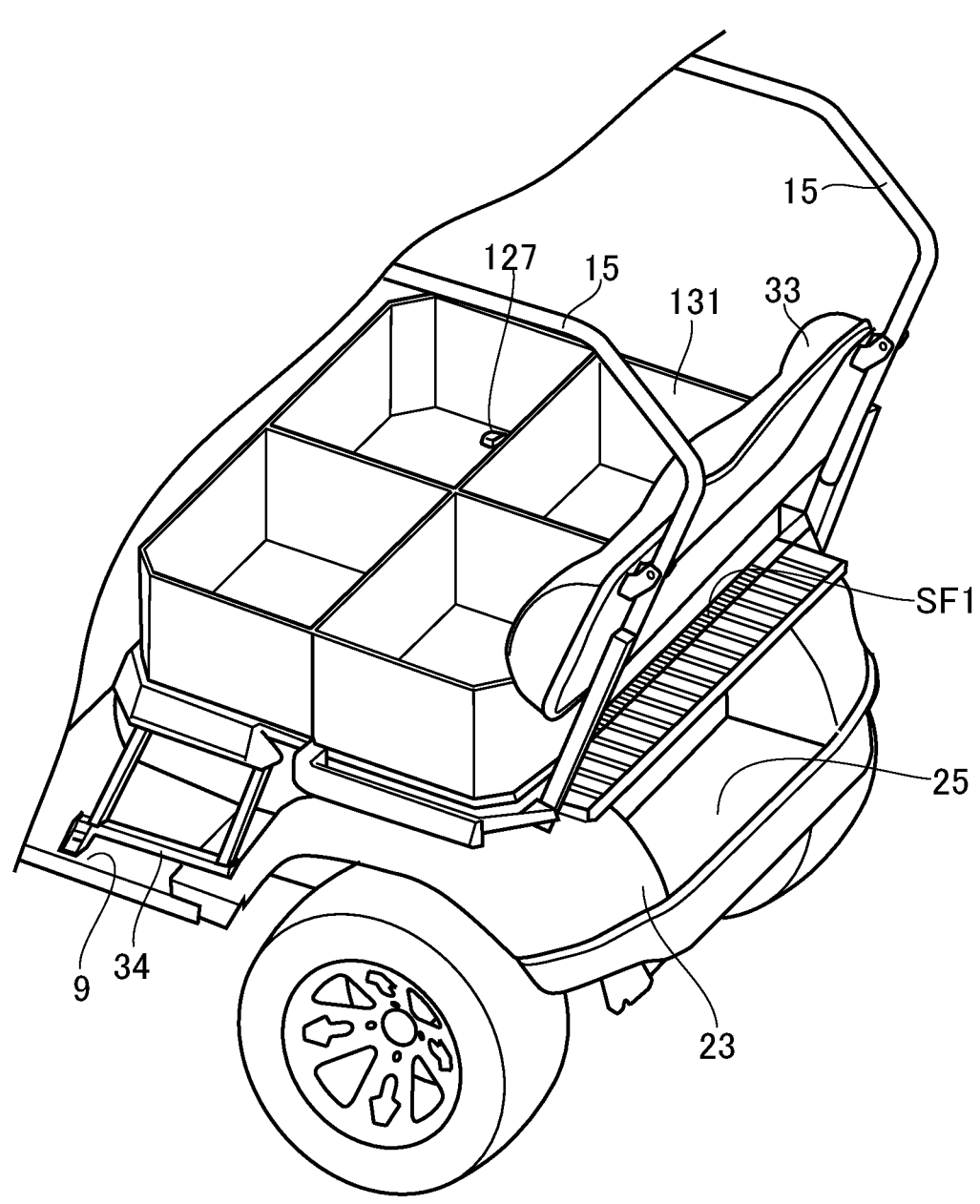
FIG. 20 is a schematic perspective view of the vicinity of the rear seat of the electric cart according to a modification of a second embodiment, illustrating a state in which a second accessory is attached to the formed loading section.

Next, a modification of the loading surface SF1 is described with reference to FIGS. 18 to 20. FIG. 18 is a perspective view of the vicinity of the rear seat 31, illustrating a state where the bottom surface 32b of the rear seat bottom 32 and the upper surface 51a of the rear seat base 51 form the loading surface SF1. FIG. 19 is a diagram illustrating a state where accessories are attached to the loading surface SF1 illustrated in FIG. 18. FIG. 20 is a diagram illustrating a state where another accessory is attached to the loading surface SF1 illustrated in FIG. 18.

In the modification illustrated in FIG. 18, a plurality of attachment holes 115 are provided on the loading surface SF1. The attachment holes 115 are provided in the vicinity of the outer peripheral edge of the loading surface SF1. In this example, the bottom surface 32b of the rear seat bottom 32 is provided with a pair of attachment holes 115 at symmetrical positions in the left-right direction, and the upper surface 51a of the rear seat base 51 is provided with a pair of attachment holes 115 at symmetrical positions in the left-right direction. That is, a total of four attachment holes 115 are provided. Also, the pair of attachment holes 115 provided in the bottom surface 32b of the rear seat bottom 32 are provided at positions symmetrical to the pair of attachment holes 115 provided in the upper surface 51a of the rear seat base 51 with respect to a boundary line between the bottom surface 32b of the rear seat bottom 32 and the upper surface 51a of the rear seat base 51.

Accessories 121 illustrated in FIG. 19, an accessory 131 illustrated in FIG. 20, or other accessories can be attached to the loading surface SF1 having such attachment holes 115.

For example, each of the two accessories 121 illustrated in FIG. 19 include a plate member 123 having a U-shape when viewed from above, and a pipe member 125 fixed to the plate member 123 and protruding from the plate member 123. The plate member 123 is provided with attachment holes at positions corresponding to the pair of attachment holes 115 in the bottom surface 32b of the rear seat bottom 32 (or the pair of attachment holes 115 provided in the upper surface 51a of the rear seat base 51). Therefore, the accessory 121 can be attached to the bottom surface 32b of the rear seat bottom 32 (or the upper surface 51a of the rear seat base 51), by aligning the attachment holes of the plate member 123 of the accessory 121 with the pair of attachment holes 115 in the bottom surface 32b of the rear seat bottom 32 (or the pair of attachment holes 115 provided in the upper surface 51a of the rear seat base 51) and then inserting fixtures 127 formed of, for example, elastic members, into the attachment holes.

By using such accessories 121, even a tall luggage can be reliably held on the loading surface SF1.

The accessory 131 illustrated in FIG. 20 is a box with an upper opening and including a plurality of partitions inside thereof. The box-shaped accessory 131 also includes attachment holes (not illustrated) on its bottom surface at positions corresponding to the four attachment holes 115 provided on the loading surface SF1. With this, similar to the accessories 121 illustrated in FIG. 19, the accessory 131 illustrated in FIG. 20 can be fixed to the loading surface SF1 using the fixtures 127.

As described above, in the modification of the loading surface SF1 illustrated in FIG. 18, the loading surface SF1 includes the one or more attachment holes 115. Thus, accessories (for example, the accessories 121 illustrated in FIG. 19, the accessory 131 illustrated in FIG. 20, or the like) can be attached to the loading surface SF1. As a result, a load (for example, a round load, a tall load) that is difficult to prevent from falling off only with the flanges 63, 65, 67 around the loading surface SF1 can be placed.

[Modification of Support Structure for Rear Seat Bottom]

Figure 21:
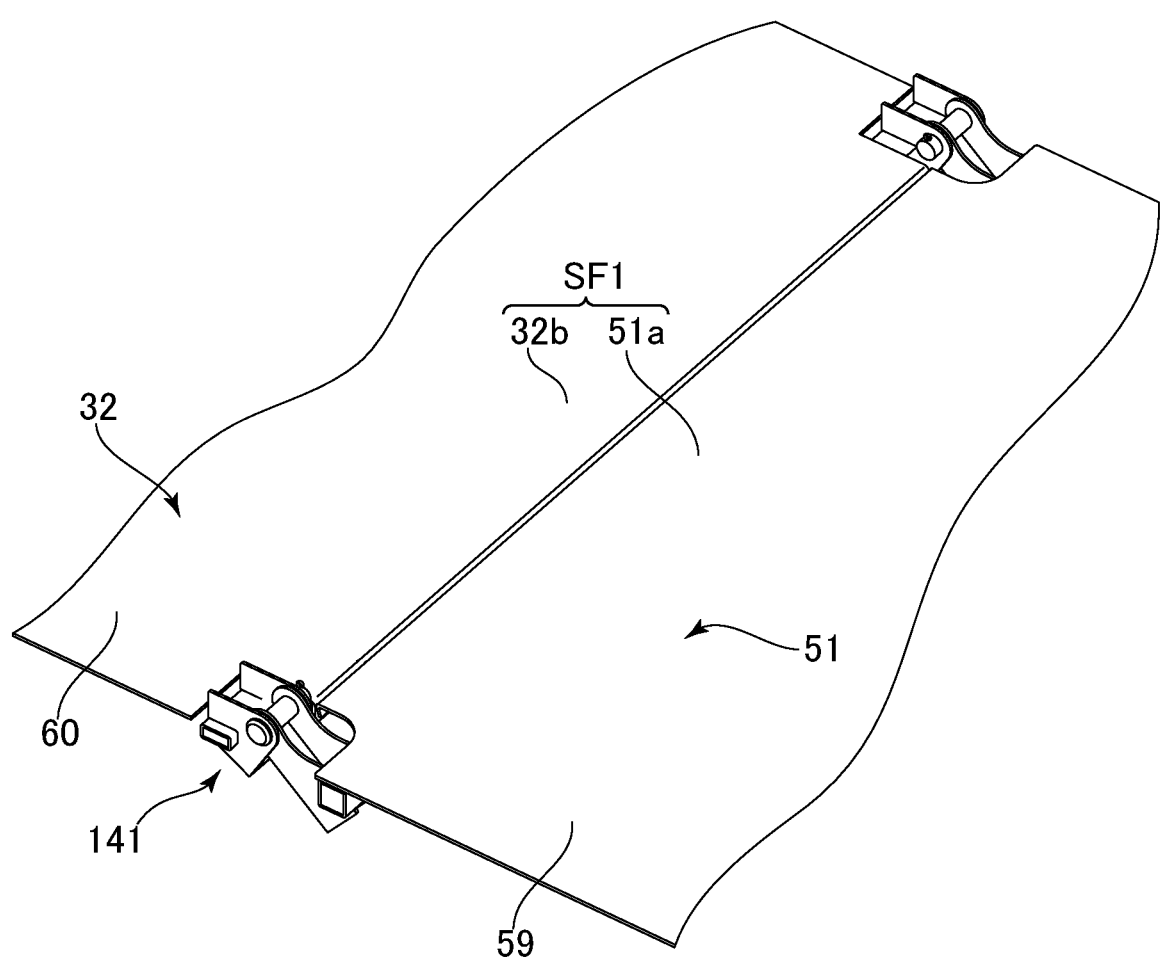
FIG. 21 is a diagram illustrating a modification of the support structure for the rear seat bottom.

Next, a modification of the support structure for supporting the rear seat bottom is described with reference to FIGS. 21 to 23. FIG. 21 is a diagram illustrating a modification of the support structure for supporting the rear seat bottom, FIG. 22 is an enlarged perspective view of part of FIG. 21, and FIG. 23 is an enlarged side view of part of FIG. 21.

In first and second embodiments described above, a case has been described in which the hinge 69 is provided over substantially the entire width of the front end of the upper surface 51a of the rear seat base 51 (see FIG. 7), and the rear seat bottom 32 is rotatably attached to the rear seat base 51 via the hinge 69. However, the disclosure is not limited thereto. For example, as in the modification of FIGS. 21 to 23, rotation support parts 141 may be provided at both left and right ends of the front end portion of the upper surface 51a of the rear seat base 51 and the rear seat bottom 32 may be rotatably attached to the rear seat base 51 via the rotation support parts 141.

Figure 22:
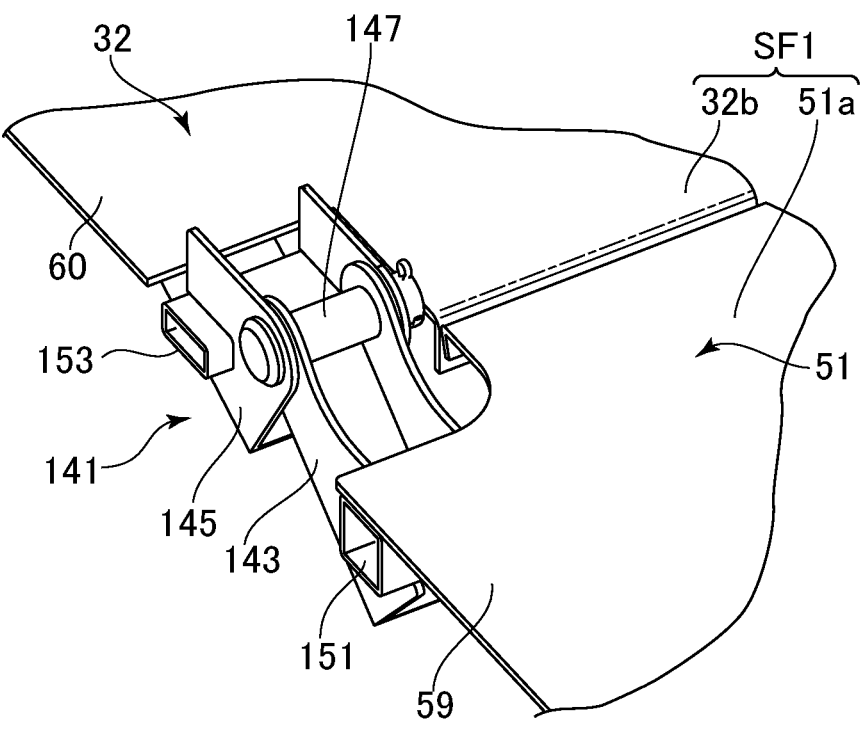
FIG. 22 is an enlarged perspective view of a portion of FIG. 21.
Figure 23:
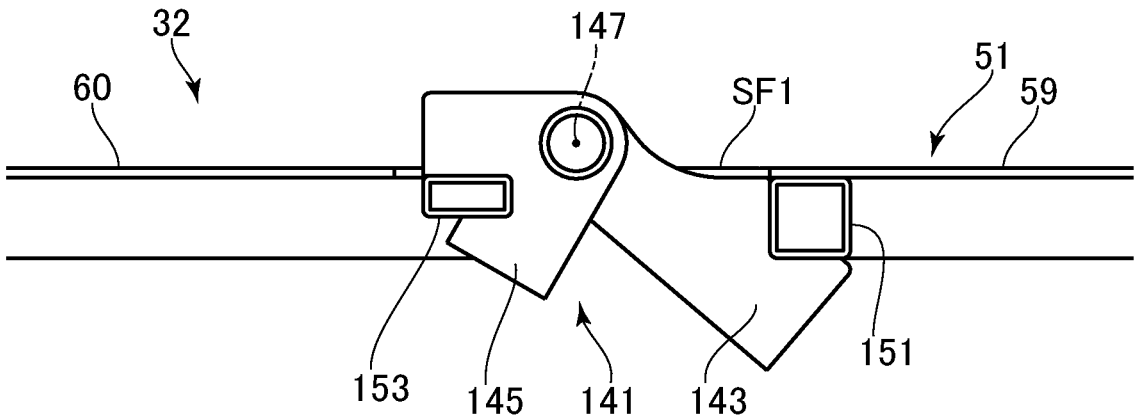
FIG. 23 is an enlarged side view of a portion of FIG. 21.

As illustrated in FIGS. 22 and 23, each rotation support part 141 includes: a bracket 143 attached to the panel member 59 forming the upper surface 51a of the rear seat base 51; a bracket 145 attached to the panel member 60 forming the bottom surface 32b of the rear seat bottom 32; and a rotation shaft 147 connecting these brackets 143 and 145.

More specifically, a reinforcement member 151 having a closed cross-sectional structure extending in the vehicle width direction is attached to the panel member 59 forming the upper surface 51a of the rear seat base 51 at the vicinity of the front end of the panel member 59. The brackets 143 are attached to both end portions of the reinforcement member 151 in the vehicle width direction. Also, a reinforcement member 153 having a closed cross-sectional structure extending in the vehicle width direction is attached to the panel member 60 forming the bottom surface 32b of the rear seat bottom 32 at the vicinity of the front end portion of the panel member 60. The brackets 145 are attached to both end portions of the reinforcement member 153 in the vehicle width direction.

The brackets 143 and 145 are provided with through-holes respectively, and the rotation shaft 147 is inserted into the through-holes so that the bracket 145 can rotate relative to the bracket 143 about the rotation shaft 147. That is, the rear seat bottom 32 is rotatable with respect to the rear seat base 51 about the rotation shaft 147.

Further, as illustrated in FIG. 23, the center of the rotation shaft 147 is not aligned with the loading surface SF1 and is provided above the loading surface SF1.

In the modification illustrated in FIGS. 21 to 23, since the substantially entire width of the front end of the upper surface 51a of the rear seat base 51 is not provided with unevenness due to the hinge 69, the boundary between the upper surface 51a of the rear seat base 51 and the bottom surface 32b of the seat bottom 32 becomes a smooth boundary.

[Modifications of Armrest]

Figure 24:
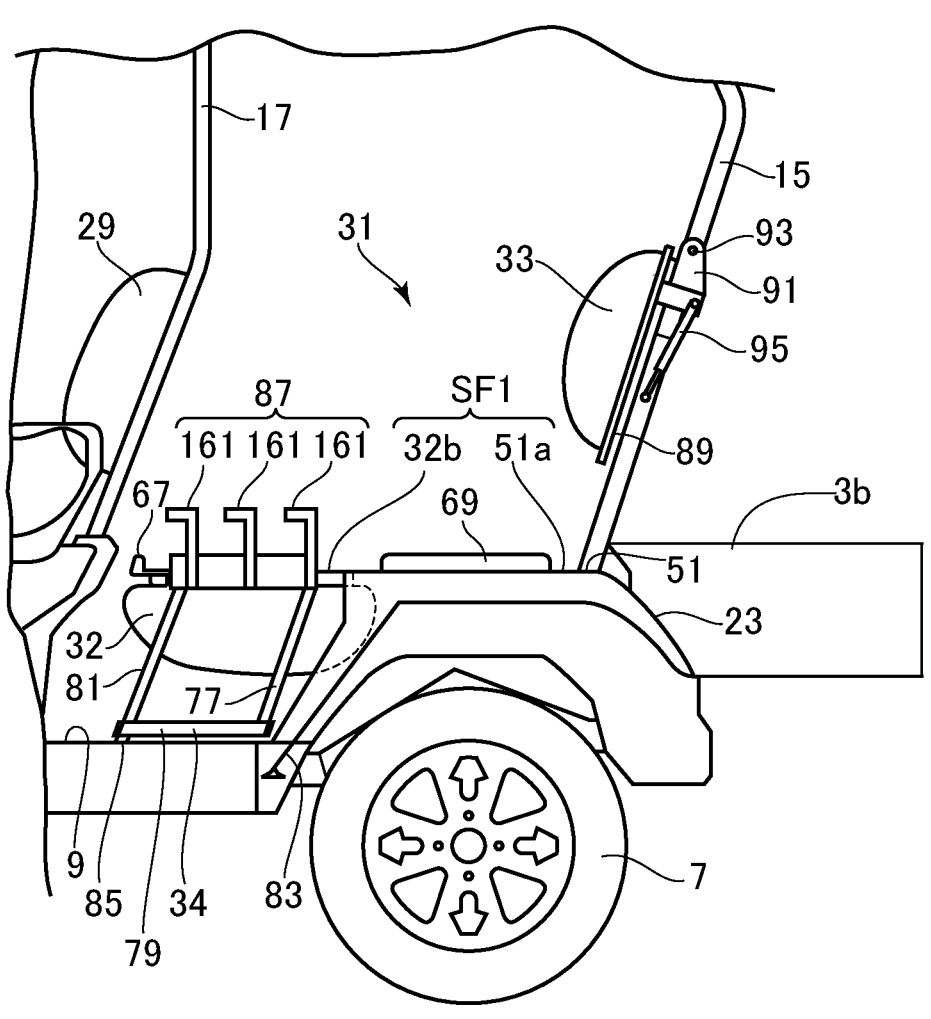
FIG. 24 is a diagram illustrating a first modification of an armrest fixed to the rear seat bottom according to a second embodiment.
Figure 25:
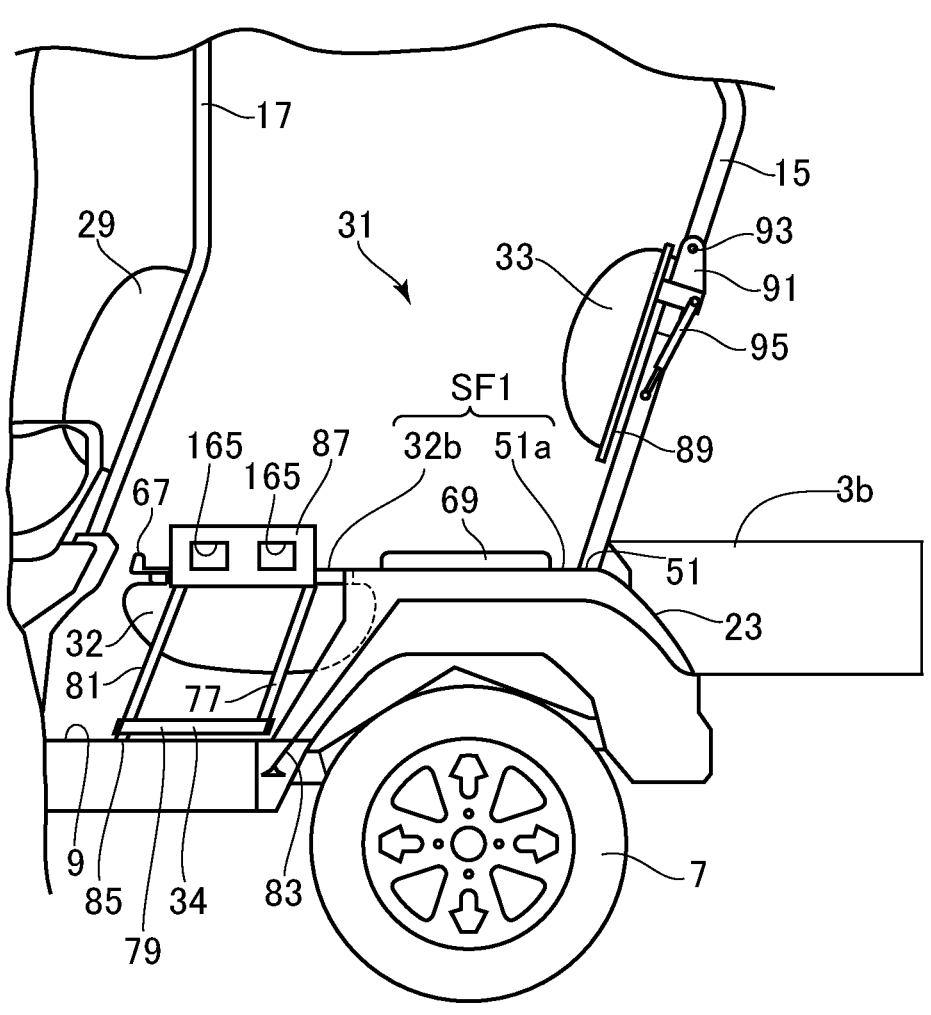
FIG. 25 is a diagram illustrating a second modification of an armrest fixed to the rear seat bottom according to a second embodiment.

Next, modifications of the armrest 34 according to a second embodiment are described below with reference to FIGS. 24 to 25. FIG. 24 is a diagram illustrating a first modification of the armrest 34 fixed to the rear seat bottom 32. FIG. 25 is a diagram illustrating a second modification of the armrest 34 fixed to the rear seat bottom 32.

In the armrest 34 according to a first modification illustrated in FIG. 24, a flange portion 87 protruding from the armrest base is provided with a plurality of hook portions 161, and the hook portions 161 can be used to hook a luggage or a string for tying the luggage. In the armrest 34 according to a second modification illustrated in FIG. 25, a plurality of holes 165 are provided in the flange portion 87 projecting from the armrest base, and these holes 165 can be used to hook a luggage or a string for tying the luggage to the flange portion 87.

As described above, in the first modification illustrated in FIG. 24 and the second modification illustrated in FIG. 25, the flange portion 87 of the armrest 34 can be used to hook luggage or a string for tying the luggage, which further increases convenience.

Oher Modifications

Note that in first and second embodiments described above, a case has been described in which the intermediate pillar 17 functions as a front seat back support member that supports the front seat back 29. However, the disclosure is not limited thereto. For example, the vehicle body 3 may include a seat back support member without including the intermediate pillar 17, or may separately include a front seat back support member in addition to the intermediate pillar 17.

Further, in first and second embodiments described above, a case has been described in which the rear pillars 15 function as rear seat back support members that support the rear seat back 33. However, the disclosure is not limited thereto. For example, the vehicle body 3 may be provided with a rear seat back support member(s) without including the rear pillars 15 or may separately include a rear seat back support member(s) in addition to the rear pillars 15.

Further, in first and second embodiments described above, a case has been described in which the rear seat bottom 32 is rotatably supported by the rear seat base 51. However, the disclosure is not limited thereto. For example, the rear seat bottom 32 may be supported by a portion of the vehicle body other than the rear seat base 51 in such a manner that the rear seat bottom 32 is movable from the normal use position to the developed position.

Further, in first and second embodiments, a case has been described in which the rear seat bottom 32 is rotatably supported with respect to the vehicle body 3 via the hinge 69 and the like. However, the disclosure is not limited thereto. For example, the rear seat bottom 32 may be supported on the vehicle body using a rotary arm(s), a plurality of links, or other structures in such a manner that the rear seat bottom 32 is movable from the normal use position to the developed position. In addition, various variation or modifications can be made to first and second embodiments and modifications described above.

Third Embodiment

Figure 26:
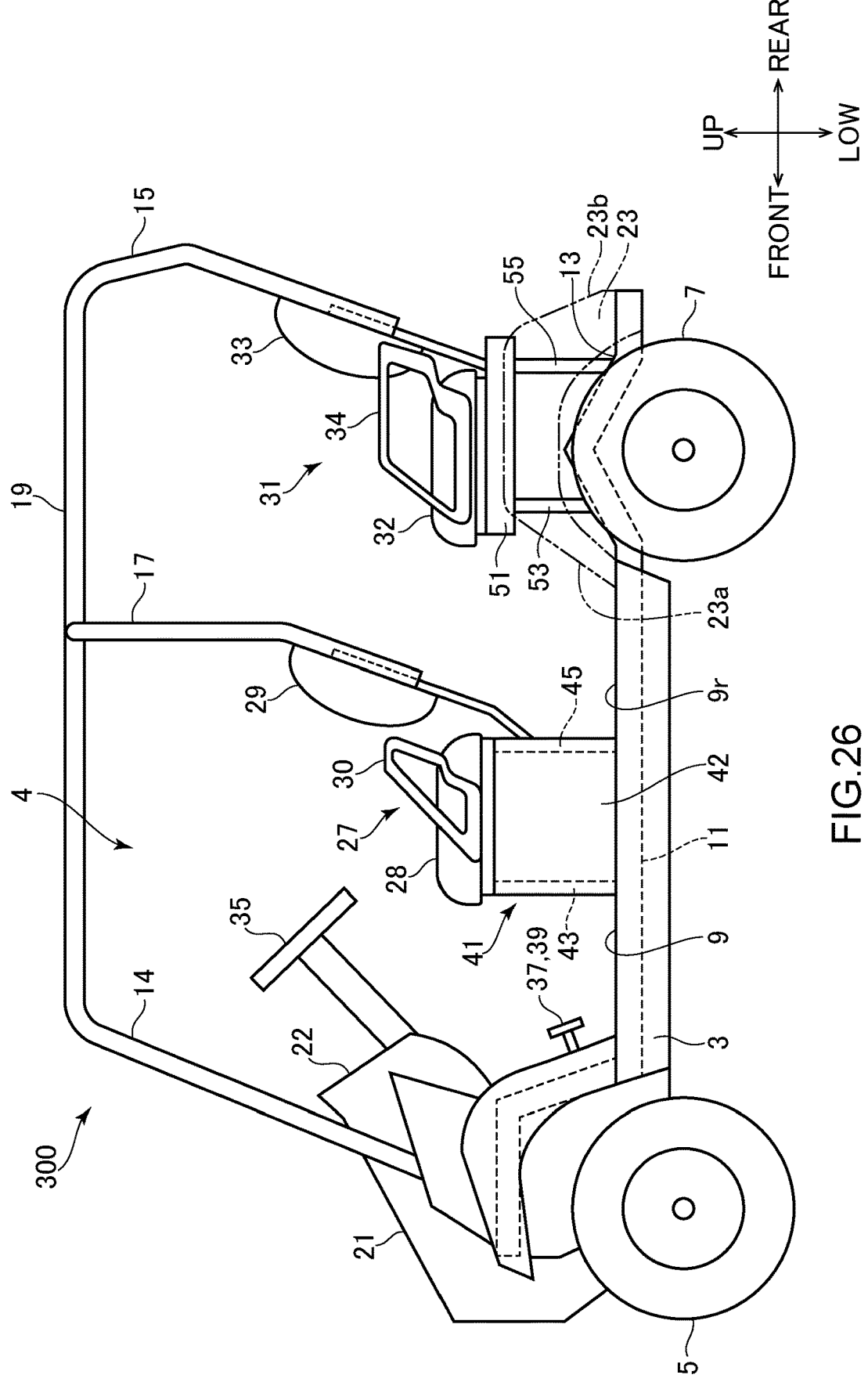
FIG. 26 is a side view of an electric cart according to a third embodiment.
Figure 27:
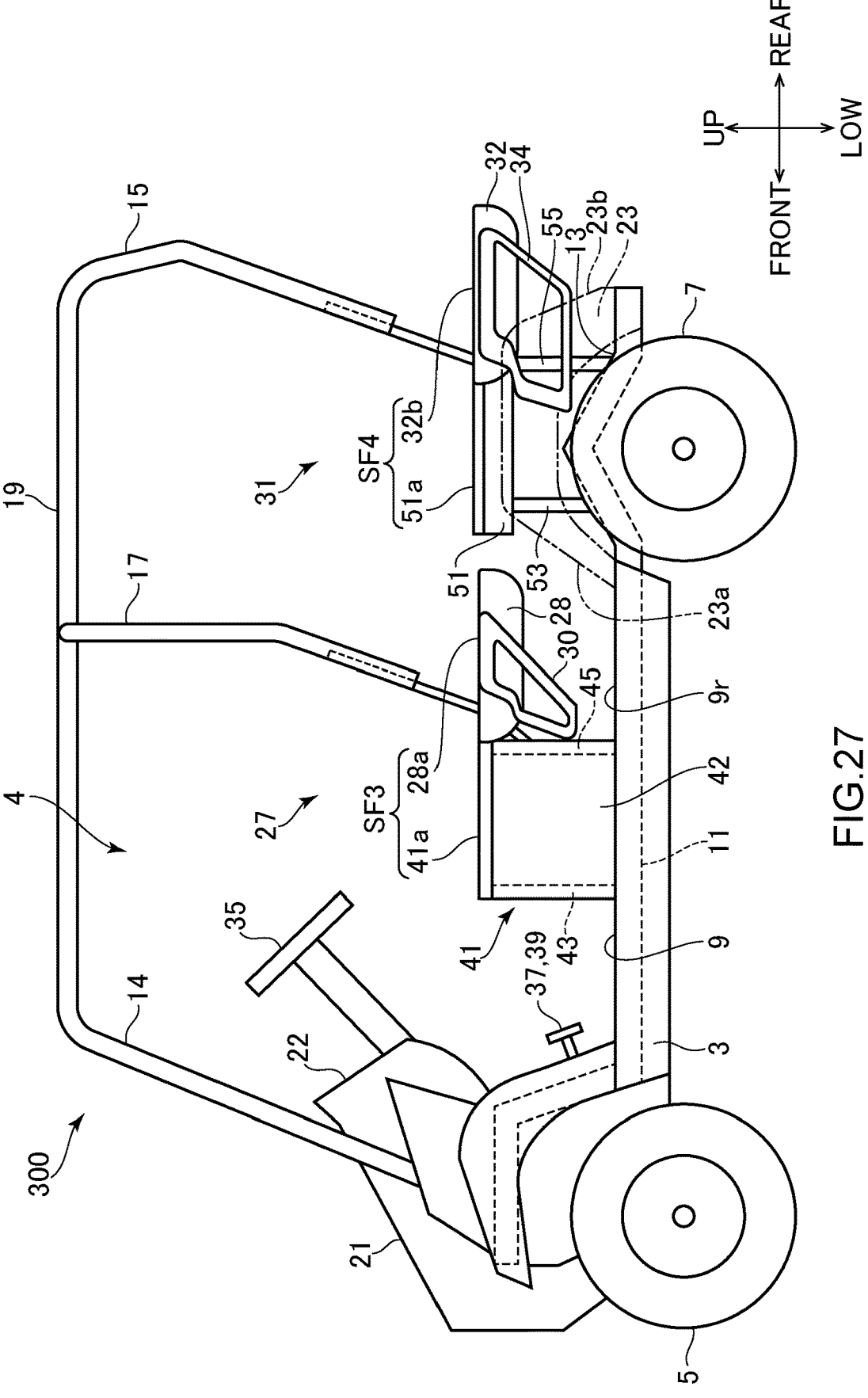
FIG. 27 is a side view of the electric cart according to a third embodiment, illustrating a state where loading sections are formed by removing a front seat back and a rear seat back and developing (turning over) a front seat bottom and a rear seat bottom to the rear side thereof.

Next, a third embodiment of the disclosure is described with reference to FIGS. 26 and 27. FIG. 26 is a schematic side view of an electric cart 300 according to a third embodiment. FIG. 27 is a schematic side view of the electric cart 300 according to a third embodiment, illustrating a state where loading sections (loading surfaces SF3, SF4) is formed by detaching the front seat back 29 and the rear seat back 33 and developing the front seat bottom 28 and the rear seat bottom 32 to the rear side thereof.

In the electric cart 300 according to a third embodiment, a front seat back support bar 301 that supports the front seat back 29 is detachably attached to the front seat base 41. Further, the rear seat back 33 is detachably attached to the rear pillars 15 via, for example, a structure such as being illustrated in FIG. 17. Note that the electric cart 300 according to a third embodiment includes no cargo bed (3b) in the back of the vehicle body 3.

In addition, the front seat bottom 28 can be developed (turned over) to the rear side thereof in a state where the front seat back 29 is removed from the front seat base 41. Specifically, the front seat bottom 28 is attached to the front seat base 41 via, for example, a hinge, a rotary arm, or the like.

In addition, the rear seat back 33 can be developed (turned over) to the rear side thereof in a state where the rear seat back 33 is removed from the rear pillars 15. Specifically, the rear seat back 33 is attached to the rear seat base 51 or the rear pillars 15 with a support structure such as a hinge, a rotary arm, or the like. Note that the support structure can use a structure disclosed in embodiments and modifications described above or a well-known structure, so detailed description and illustration are omitted to avoid redundancy.

With such a configuration, the electric cart 300 according to a third embodiment can form, by developing the front seat bottom 28 to the rear side thereof as illustrated in FIG. 27, the loading section (loading surface SF3) composed of the bottom surface 28b of the front seat bottom 28 and the upper surface 41a of the front seat base 41. Further, the electric cart 300 according to a third embodiment can form, by developing the rear seat bottom 32 to the rear side, the loading portion (loading surface SF4) composed of the bottom surface 32b of the rear seat bottom 32 and the upper surface 51a of the rear seat base 51.

Fourth Embodiment

Figure 28:
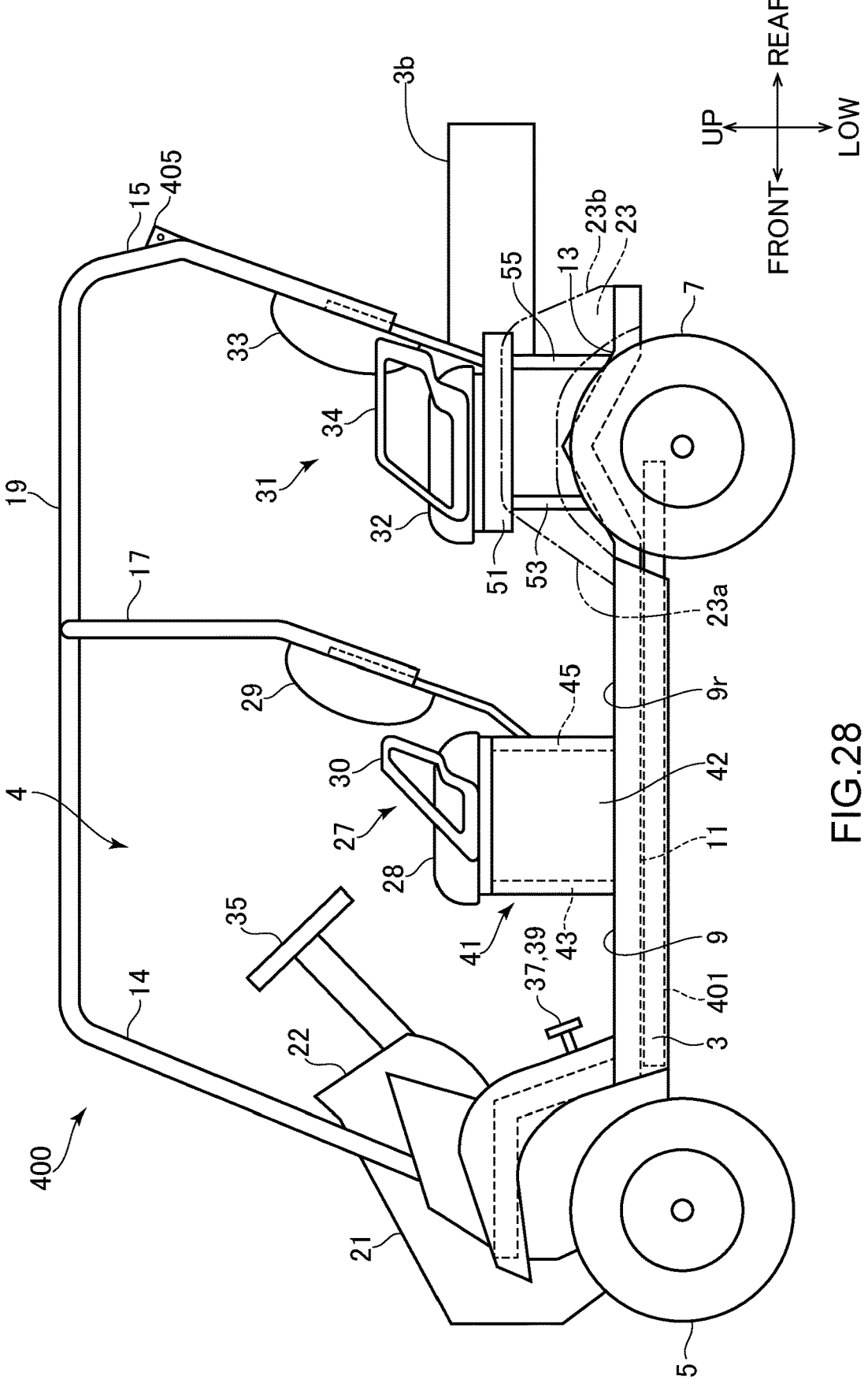
FIG. 28 is a side view of an electric cart according to a fourth embodiment, illustrating a state in which a loading board is accommodated below a vehicle body.
Figure 29:
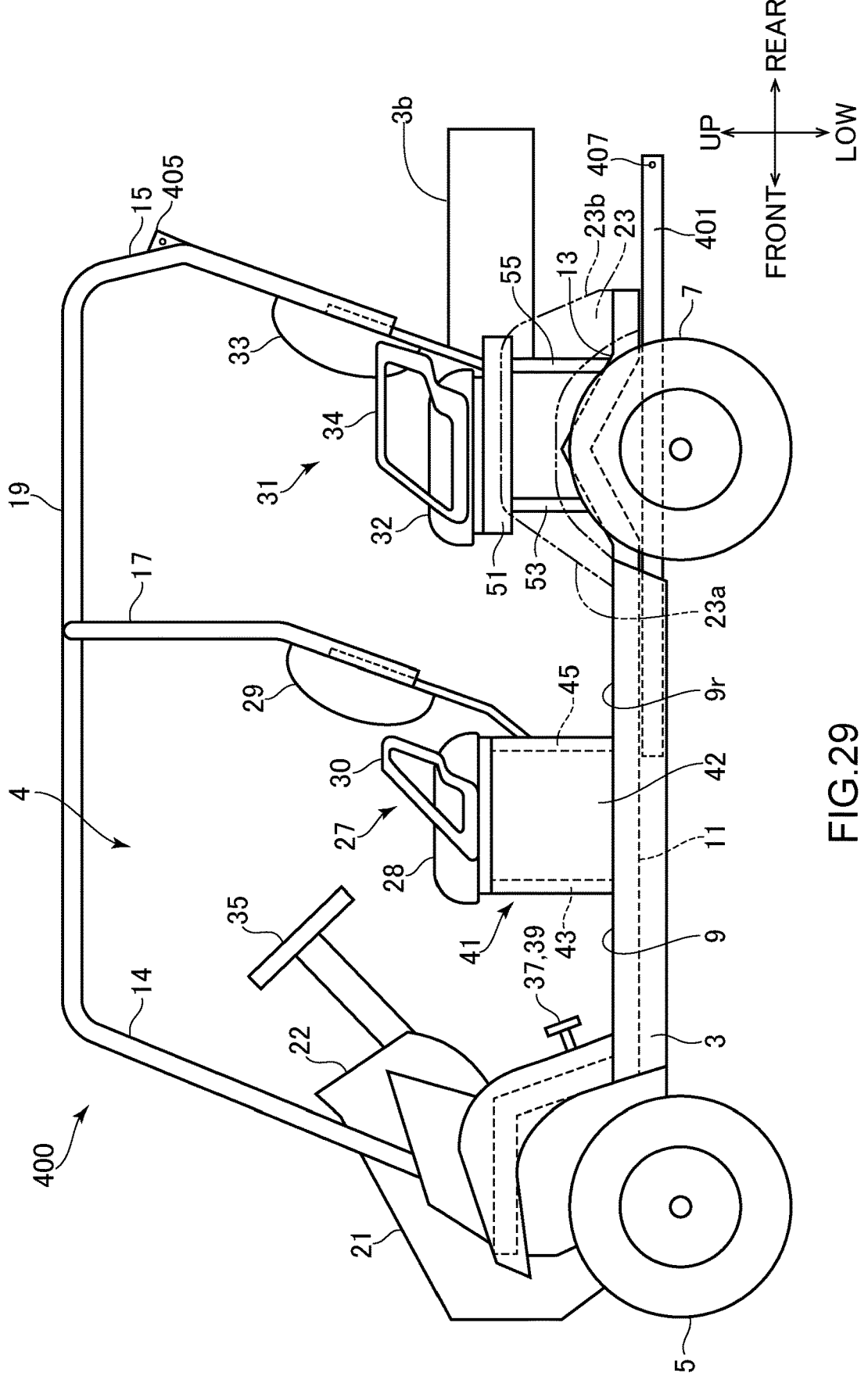
FIG. 29 is a side view of the electric cart according to a fourth embodiment, illustrating a state in which the loading board is protruded to a first protruding position.
Figure 30:
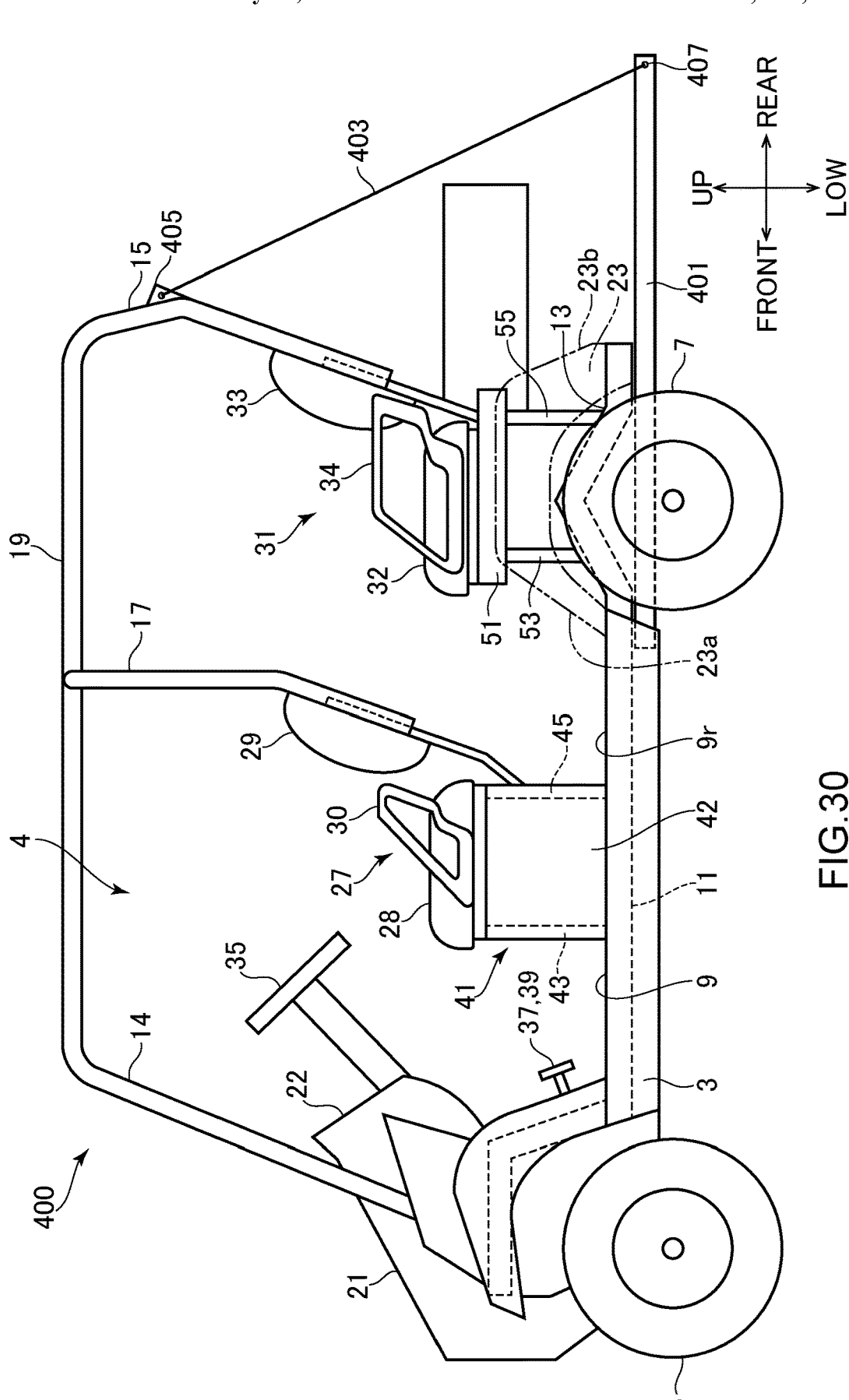
FIG. 30 is a side view of the electric cart according to a fourth embodiment, illustrating a state in which the loading board is protruded to a second protruding position.

Next, a fourth embodiment of the disclosure is described with reference to FIGS. 28 to 30. FIG. 28 is a side view of an electric cart 400 according to a fourth embodiment. FIG. 29 is a side view of the electric cart 400 according to a fourth embodiment, illustrating a state in which a loading board 401 is protruded to a first protruding position. FIG. 30 is a side view of the electric cart 400 according to a fourth embodiment, illustrating a state in which the loading board 401 is protruded to a second protruding position.

As illustrated in FIG. 28, the electric cart 400 according to a fourth embodiment differs from first and second embodiments described above in that the loading board 401 is provided below the vehicle body 3, that is, below the floor 9. The loading board 401 is supported by the main frame 11 (not illustrated in FIGS. 28 to 30) provided under the vehicle body 3 so as to be slidable in the longitudinal direction via slide guide portions (not illustrated).

As illustrated in FIG. 28, an entirety or a substantially entirety of the loading board 401 is normally hidden under the vehicle body 3. That is, normally, the entirety or the substantially entirety of the loading board 401 overlaps the vehicle body 3 when viewed in the vertical direction.

When the user wants to use the lading board 401 by protruding the loading board 401 to the rear of the vehicle, the user operates, for example, an operation device such as a switch or the like provided on the dashboard 22 to drive a motor (not illustrated) to move the loading board 401 so as to protrude the loading board 401 to the first protruding position of FIG. 29 or the second protruding position of FIG. 30.

For example, since the loading board 401 at the second protruding position illustrated in FIG. 30 protrudes more than at the first protruding position, the rear end portion of the loading board 401 can be hung by wires 403 hooked on the rear pillars 15, for example. That is, in the electric cart 400 according to a fourth embodiment, the middle portions or the upper end portions of the left and right rear pillars 15 are provided with engagement portions (for example, engagement holes 405) for hooking one end portions of the wires 403. Also, the left and right ends of the rear end portion of the loading board 401 are provided with engagement portions (for example, the engagement holes 407) for hooking lower end portions of the wires 403.

Effects of Fourth Embodiment

According to such a fourth embodiment, the loading board 401 is slidably provided under the floor 9 of the vehicle body 3. Therefore, if necessary, the loading board 401 can be protruded from below the floor 9 toward the rear of the vehicle body and the protruded loading board 401 can be used.

Further, according to a fourth embodiment, the amount of protrusion of the loading board 401 can be adjusted in multiple stages. Accordingly, the amount of protrusion of the loading board 401 can be adjusted appropriately according to the amount of luggage to be placed.

Further, according to a fourth embodiment, the loading board 401 includes at the rear end portion thereof the engagement portions (e.g., the engagement holes 407) for hooking wires 403, springs, rods, or the like. Therefore, even when the loading board 401 protrudes by a large amount, the loading board 401 can be properly supported by the vehicle body 3 without being cantilevered.

Modifications of Fourth Embodiment

Figure 31:
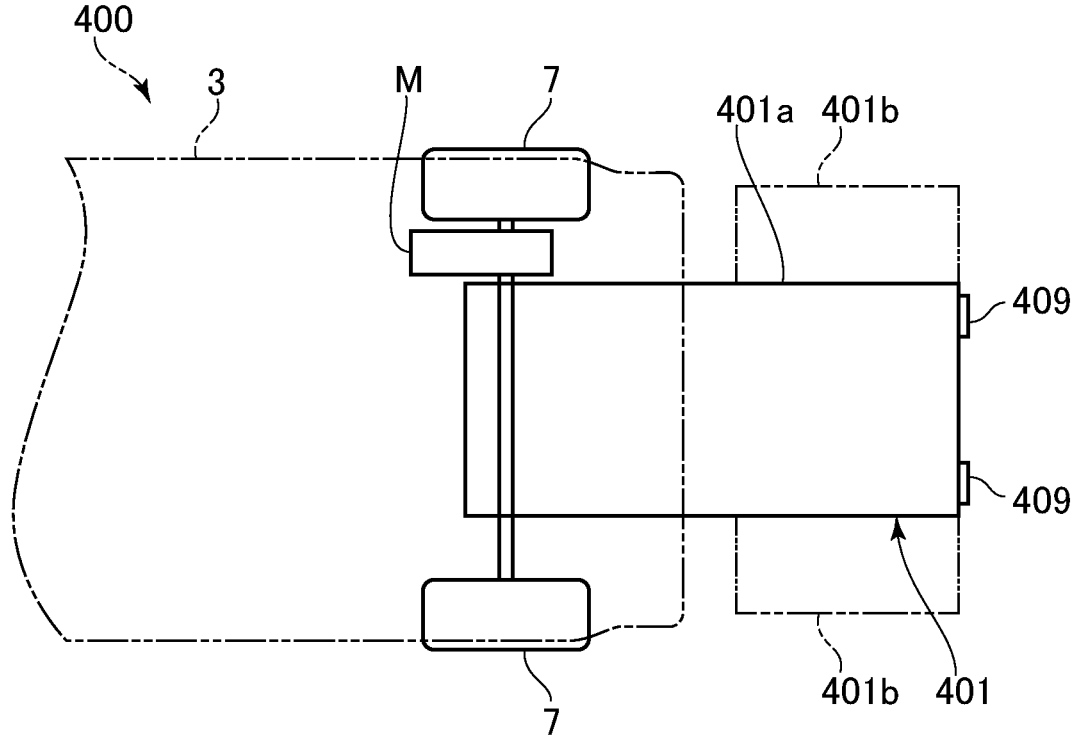
FIG. 31 is a schematic diagram of an electric cart according to a modification of a fourth embodiment, illustrating a positional relationship between a loading board, wheels, and an electric motor.
Figure 32:
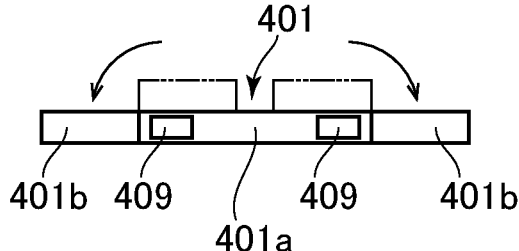
FIG. 32 is a schematic rear view of the loading board of the electric cart according to the modification of a fourth embodiment.

Next, a modification according to a fourth embodiment is described with reference to FIGS. 31 and 32. FIG. 31 is a schematic diagram illustrating a positional relationship between the loading board 401, the rear wheels 7, and the electric motor M of the electric cart 400 according to a modification of a fourth embodiment. FIG. 32 is a schematic diagram illustrating the loading board 401 of the electric cart 400 according to the modification of a fourth embodiment.

In this modification, as illustrated in FIG. 31, the electric motor M for driving the electric cart 400 is arranged at a position off the center in the vehicle width direction. More specifically, the electric motor M is provided at a position close to one of the left and right rear wheels (the right rear wheel in this example), so that the electric motor M and the loading board 401 are not overlapped with each other as seen in the vertical direction. With this, it is possible to dispose the electric motor M and the loading board 401 at positions overlapping each other as seen in the horizontal direction. Therefore, the structure below the floor 9 can be made more compact in the vertical direction than in the case where the electric motor M and the loading board 401 overlap each other as seen in the vertical direction.

Further, as illustrated in FIG. 31, the loading board 401 includes a loading board main body 401$a$ and expansion board parts 401$b$ each of which is rotatably attached to a rear end portion of the loading board main body 401$a$ via a support portion such as a hinge or the like. With this, in the state where the loading board 401 protrudes to the rear side of the vehicle body 3, the expansion board parts 401$b$ can be developed from the loading board main body 401$a$, so as to expand the area of the loading board 401.

Further, as illustrated in FIG. 32, the loading board 401 is provided with tail lamps 409 of the electric cart 400 on a rear end surface of the loading board main body 401$a$. Note that although the tail lamps 409 are provided on the loading board main body 401$a$ in FIG. 32, the tail lamp(s) 409 may be provided on the expansion board part(s) 401$b$.

Fifth Embodiment

Figure 33:
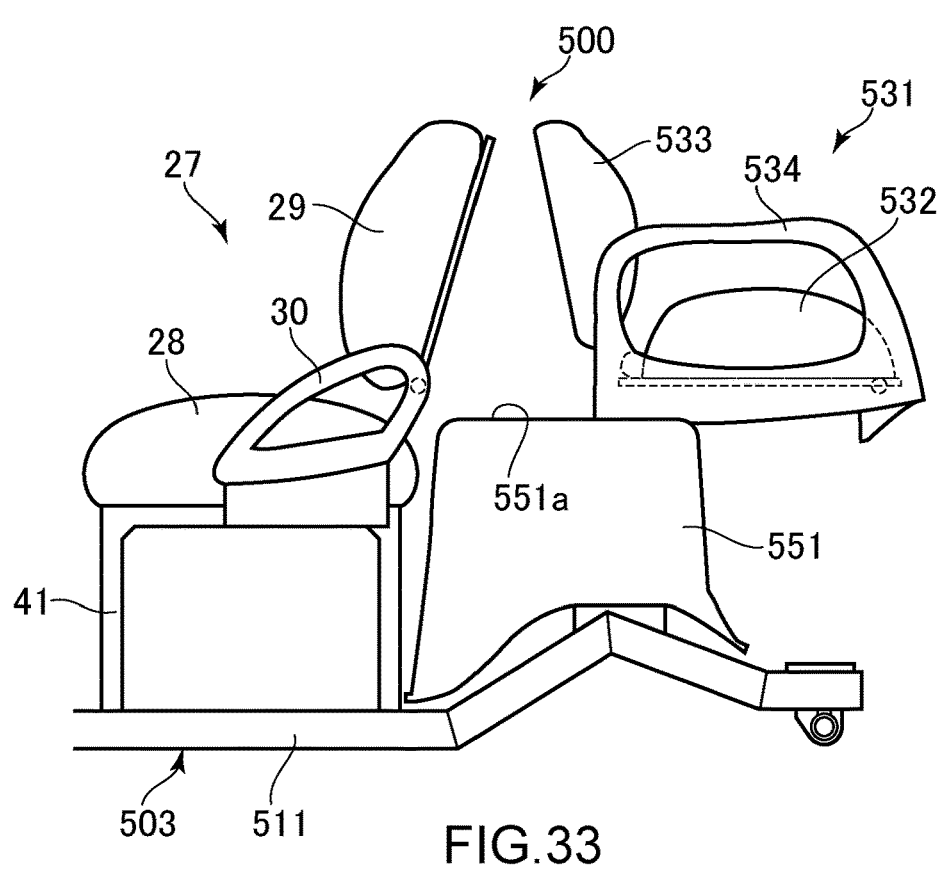
FIG. 33 is a schematic side view illustrating a front seat and a rear seat of an electric cart according to a fifth embodiment.
Figure 34:
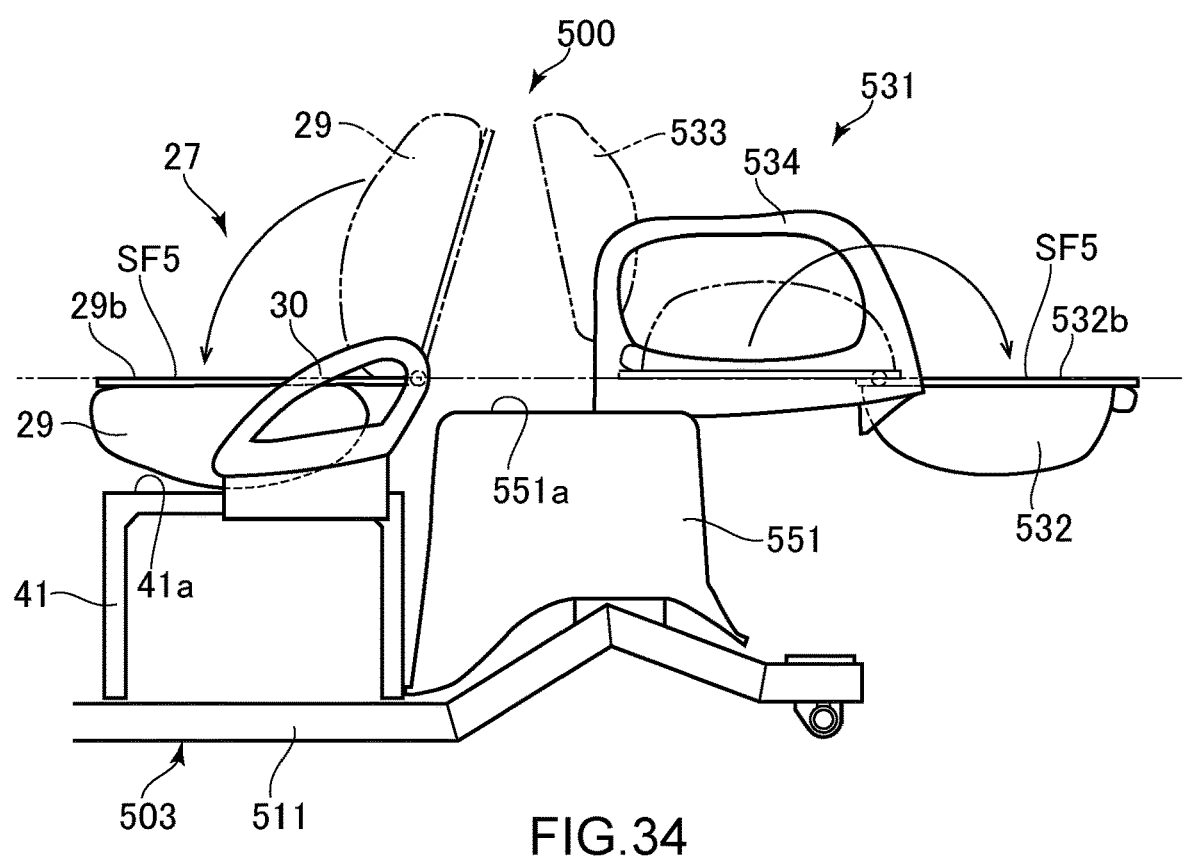
FIG. 34 is a schematic side view illustrating the front and rear seats of the electric cart according to a fifth embodiment, illustrating a state in which a loading section is formed by removing a front seat bottom, folding a front seat back, removing a rear seat back, and developing a rear seat bottom.

Next, an electric cart 500 according to a fifth embodiment of the disclosure is described with reference to FIGS. 33 and 34. FIG. 33 is a schematic side view illustrating the vicinity of front and rear seats of the electric cart 500 according to a fifth embodiment. FIG. 34 is a schematic side view illustrating the front and rear seats of the electric cart 500 according to a fifth embodiment, illustrating a state in which a loading surface SF5 is formed by removing a front seat bottom 28, folding a front seat back 29 of a front seat 27, removing a rear seat back 533, and developing a rear seat bottom 532 of a rear seat 531. Note that FIGS. 33 and 34 illustrate the front seat 27, the front seat base 41, the rear seat 531, a rear seat base 551, and a main frame 511 of the electric cart 500, other configurations are omitted from illustration and description to avoid redundancy.

In first to fourth embodiments described above, the rear seat 31 is provided behind the front seat 27 across the rear seat passenger passage 9$r$ and faces forward of the vehicle. However, in a fifth embodiment, the rear seat 531 is provided behind the front seat 27 with no rear seat passenger passage therebetween and faces the rear direction of the vehicle. Further, in a fifth embodiment, a vehicle body 503 and the main frame 511 are shorter in the longitudinal direction than the vehicle bodies 3 and the main frames 11 of first to fourth embodiments described above.

Further, in a fifth embodiment, the front seat bottom 28 is detachably attached to the front seat base 41. In addition, the front seat back 29 is attached to the vehicle body 503 (for example, the front seat base 41, the intermediate pillars (not illustrated), or the like) via a rotation support structure such as a hinge, a rotary arm, or the like, so as to be folded forward. (See FIG. 34).

Therefore, as illustrated in FIG. 34, the front seat back 29 can be folded forward with the front seat bottom 27 removed from the front seat base 41. As illustrated in FIG. 34, in the state where the front seat back 29 is folded forward, a back surface 29$b$ of the front seat back 29 is substantially horizontal and faces upward.

Further, in a fifth embodiment, the rear seat back 533 is detachably attached to the vehicle body 503 (for example, the rear seat base 551, intermediate pillars (not illustrated), or the like). Also, the rear seat bottom 532 is attached to the vehicle body 503 (for example, the rear seat base 511, the intermediate pillars (not illustrated), or the like) via a rotation support structure such as a hinge, a rotary arm, or the like so as to be developed (turned over) to the rear side thereof.

Therefore, as illustrated in FIG. 34, with the rear seat back 533 removed from the vehicle body 503, the rear seat bottom 532 can be developed (turned over) to the rear side. As illustrated in FIG. 34, in the state where the rear seat bottom 532 is developed (turned over) to the rear side, a bottom surface 532b of the rear seat bottom 532 is substantially horizontal and faces upward and is substantially flush with (at the same height as) the back surface 29b of the front seat back 29 that is folded to the front side. As a result, the back surface 29b of the front seat back 29 and the bottom surface 532b of the rear seat bottom 532, which are substantially flush with each other, form the discontinuous loading surface SF5.

As described above, in a fifth embodiment, similarly to first and second embodiments described above, the convenience of the vehicle can be improved by forming the loading surface SF5 as necessary.

Modifications of Fifth Embodiment

Figures 35, 36, 37:
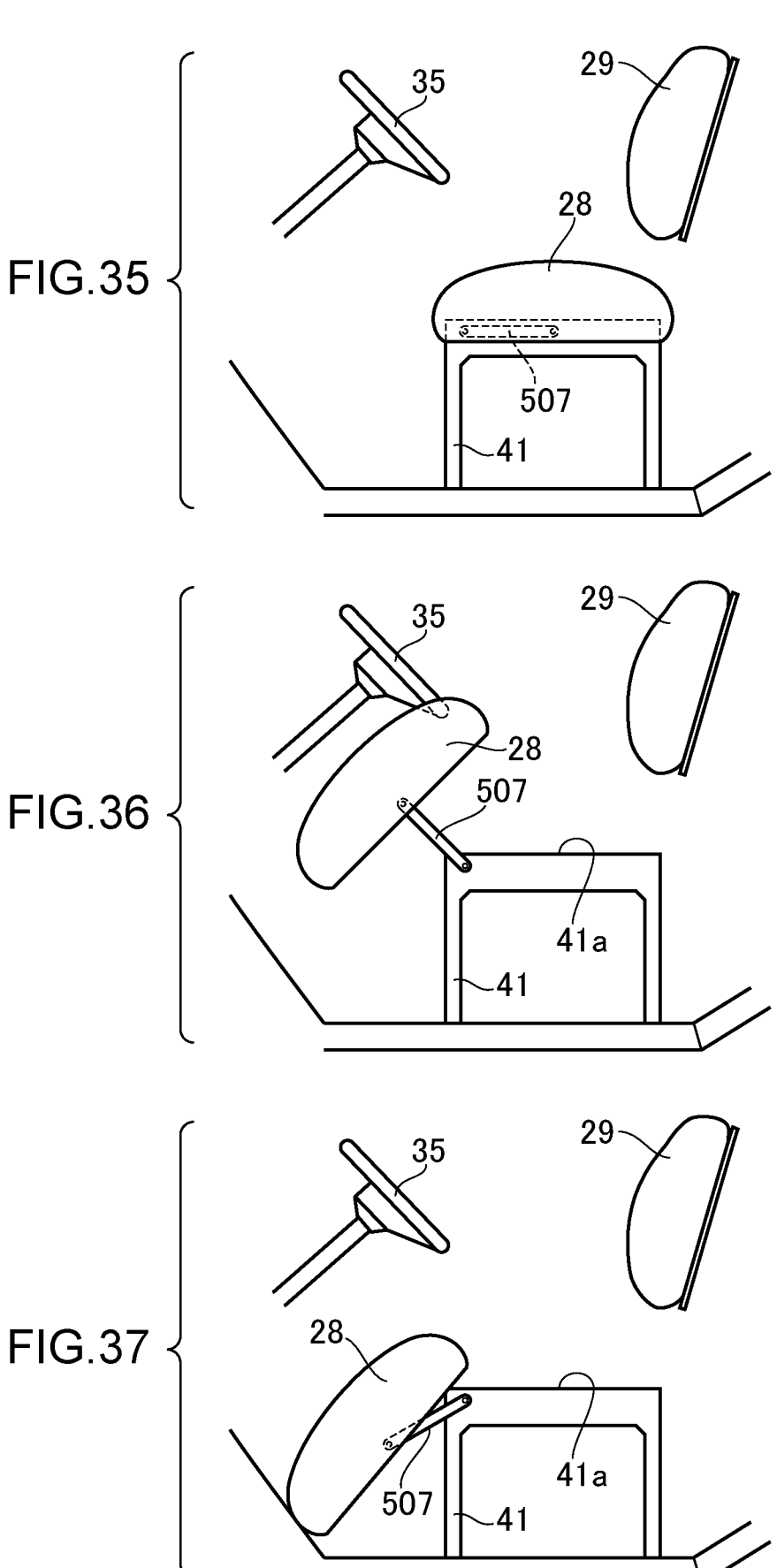
FIG. 35 is a schematic side view illustrating a support structure for a front seat bottom according to a modification of a fifth embodiment.
FIG. 36 is a schematic side view illustrating the support structure for the front seat bottom according to the modification of a fifth embodiment.
FIG. 37 is a schematic side view illustrating the support structure for the front seat bottom according to the modification of a fifth embodiment.
Figure 38:
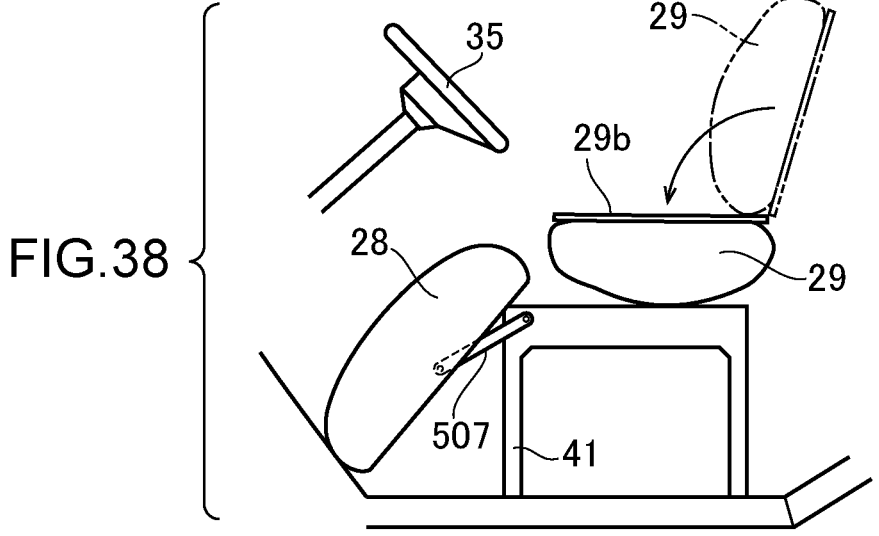
FIG. 38 is a schematic side view illustrating the support structure for the front seat bottom according to the modification of a fifth embodiment.

Next, a modification of a fifth embodiment is described with reference to FIGS. 35 to 38. FIGS. 35 to 38 are schematic side views illustrating a support structure for the front seat bottom 28 according to a modification of a fifth embodiment, wherein FIG. 35 illustrates a normal use position of the front seat bottom, FIG. 38 illustrates a retracted position of the front seat bottom, and FIGS. 36 and 37 illustrate states in the middle of movement of the front seat bottom from the normal use position to the retracted position.

In a fifth embodiment described above, the front seat bottom 28 is configured to be detachable from the vehicle body 503, but in this modification, the front seat bottom 28 is configured to be removable from the upper surface 41a of the front seat base 41 so as to be retracted to the front side of the front seat base 41 while the front seat bottom 28 is supported by the front seat base 41 via the rotary arm 507.

According to this modification, even when the front seat bottom 28 is removed from the normal use position (FIG. 35), the front seat bottom 28 is kept to be held on the vehicle body 503 (in this example, the front seat base 41). Therefore, the loss of the front seat bottom 28 can be prevented.

In first to fifth embodiments described above, a case has been described in which the vehicle body includes the floor panel, the main frame under the floor panel, the cross members, the cross beams, the pillars, and etc. However, the disclosure is not limited thereto and a vehicle body may have a structure other than that.

Further, in the first to fifth embodiments described above, a case has been described in which the vehicle including two rows of the seats. However, the disclosure is not limited thereto. That is, a vehicle according to the disclosure may include three or more rows of seats.

Further, in first to fifth embodiments described above, a case has been described in which the front seat 27 is the first seat and the rear seat 31 is the second seat. However, the disclosure is not limited thereto. For example, in the disclosure, second and third row seats may correspond to first and second seats in the claims, respectively, and third and fourth row seats may correspond to first and second seats in the claims, respectively. Also, other interpretations may be also possible.

Further, in first to fifth embodiments described above, the electric passenger transport vehicle is the electric cart driven by the electric motor. However, the disclosure is not limited thereto.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A passenger transport vehicle comprising:
   a vehicle body including a floor, a first seat base, a second seat base provided on a rear side of the first seat base;
   a first seat including a first seat bottom attached to an upper surface of the first seat base; and
   a second seat including a second seat bottom attached to an upper surface of the second seat base, wherein
   the second seat bottom is supported by the vehicle body such that the second seat bottom is movable between a first position in which a bottom surface of the second seat bottom is provided above the upper surface of the second seat base and faces downward and a second position in which the bottom surface of the second seat bottom is provided in front of or in back of the upper surface of the second seat base and faces upward,
   a pair of armrests are fixed to left and right end portions of the second seat bottom and are configured to move together with the second seat bottom, and
   each armrest of the pair of armrests includes a contact portion configured, when the second seat bottom is moved to the second position, to come in contact with the floor such that the second seat bottom is supported by the floor via the pair of armrests at the second position of the second seat bottom.

2. The passenger transport vehicle according to claim 1, wherein
   the bottom surface of the second seat bottom is provided, at part of a peripheral edge thereof, with a flange projecting in a direction crossing the bottom surface of the second seat bottom.

3. The passenger transport vehicle according to claim 1, wherein
   at least one of the contact portion and a portion of the floor that comes in contact with the contact portion is provided with a damper.

4. The passenger transport vehicle according to claim 1, wherein
   the contact portion is provided at a rear end portion of each armrest of the pair of armrests.

5. The passenger transport vehicle according to claim 1, wherein
   each armrest of the pair of armrests includes a flange portion projecting downward from a position corresponding a peripheral edge portion of the bottom surface of the second seat bottom.

6. The passenger transport vehicle according to claim 5, wherein the flange portion of each armrest of the pair of armrests includes a hook portion or a hole.

7. The passenger transport vehicle according to claim 1, wherein the bottom surface of the second seat bottom is provided with a plurality of attachment holes for attaching an accessory to the bottom surface of the second seat bottom.

8. The passenger transport vehicle according to claim 1, wherein the second seat bottom is overlapped with a rear axle of the vehicle in a vertical direction.

9. The passenger transport vehicle according to claim 1, further comprising an electric motor configured to drive a front wheel or a rear wheel of the vehicle, wherein the second seat bottom is overlapped with the electric motor of the vehicle in a vertical direction.

10. The passenger transport vehicle according to claim 1, wherein in a cross sectional view of the vehicle taken along a line extending in a vehicle width direction through the first seat, an outer end of the floor is located on the outermost side of the vehicle body.

11. The passenger transport vehicle according to claim 1, wherein a rear end of the second seat bottom is located on a rear side of a front end of a rear wheel of the vehicle.

12. The passenger transport vehicle according to claim 1, wherein a seating surface of the second seat bottom is located at a position higher than a seating surface of the first seat bottom.

13. The passenger transport vehicle according to claim 1, wherein a gap is formed between a lower end of a second seat back and the upper surface of the second seat base in a vertical direction.

14. A passenger transport vehicle comprising:

a vehicle body including a floor, and plural seat bases spaced apart from each other in a longitudinal direction of the vehicle body and projecting upward from the floor; and a seat including a seat bottom attached to an upper surface of one of the plural seat bases and a seat back, wherein the seat bottom is supported by the vehicle body to be movable between: a first position in which a bottom surface of the seat bottom faces downward toward the upper surface of the one seat base; and a second position in which the bottom surface of the seat bottom is located in front of the upper surface of the one seat base and faces upward, thereby forming a loading surface by the upper surface of the one seat base and the bottom surface of the seat bottom in the second position, the seat back is rotatably supported by the vehicle body such that the seat back is developable from a normal position in which the seat back is located above a rear end portion of the seat bottom and functions as a backrest for a passenger seated on the seat bottom to a retracted position different from the normal position, the seat back includes a front surface for supporting a back of the passenger seated on the seat bottom, in the normal position, the seat back is positioned such that the front surface of the seat back faces toward a front of the vehicle, in the retracted position, the seat back is positioned: (i) above the normal position such that the front surface of the seat back faces upward; or (ii) below the normal position such that the front surface of the seat back faces a rear of the vehicle, and the seat back in the retracted position is located on a rear side or an upper side of the loading surface, which is formed by the upper surface of the one seat base and the bottom surface of the seat bottom in the second position.

15. The passenger transport vehicle according to claim 14, wherein in the normal position of the seat back, a gap is formed between a lower end portion of the seat back and the rear end portion of the seat bottom, the seat back is developable from the normal position of the seat back to the retracted position (ii) below the normal position, and at the retracted position of the seat back (ii) below the normal position, the seat back is positioned to cover the gap.

16. The passenger transport vehicle according to claim 14, wherein the seat back is rotatably supported about a rotational axis such that the seat back is developable from the normal position to the retracted position.

17. The passenger transport vehicle according to claim 14, wherein the vehicle body further comprises front pillars and rear pillars, wherein the seat back is rotatably supported by the rear pillars of the vehicle body.

*     *     *     *     *